(12) United States Patent
Lieuwen et al.

(10) Patent No.: US 7,089,746 B2
(45) Date of Patent: Aug. 15, 2006

(54) SYSTEMS AND METHODS FOR DETECTION OF BLOWOUT PRECURSORS IN COMBUSTORS

(75) Inventors: Tim C. Lieuwen, Atlanta, GA (US); Suraj Nair, Atlanta, GA (US)

(73) Assignee: Georgia Tech Reasearch Corporation, Atlanta, GA (US)

( * ) Notice: Subject to any disclaimer, the term of this patent is extended or adjusted under 35 U.S.C. 154(b) by 572 days.

(21) Appl. No.: 10/603,039

(22) Filed: Jun. 24, 2003

(65) Prior Publication Data

US 2006/0137353 A1    Jun. 29, 2006

Related U.S. Application Data

(60) Provisional application No. 60/391,748, filed on Jun. 26, 2002, provisional application No. 60/415,277, filed on Oct. 1, 2002.

(51) Int. Cl.
    *F02C 9/28*    (2006.01)
(52) U.S. Cl. .................. 60/779; 60/39.281; 701/100; 431/114
(58) Field of Classification Search .............. 60/779, 60/39.281; 701/100; 431/114
    See application file for complete search history.

(56) References Cited

U.S. PATENT DOCUMENTS

| | | | |
|---|---|---|---|
| 4,147,222 A | 4/1979 | Patten et al. ............... 175/9 |
| 5,145,355 A | 9/1992 | Poinsot et al. ............... 431/1 |
| 5,170,621 A * | 12/1992 | Barnum et al. .......... 60/39.091 |
| 5,235,802 A * | 8/1993 | Barnum et al. ............. 60/779 |
| 5,581,995 A | 12/1996 | Lucenko et al. ........... 60/39.02 |
| 5,706,643 A | 1/1998 | Snyder et al. ............ 60/39.06 |
| 5,752,379 A | 5/1998 | Schafer et al. ........... 60/39.24 |
| 6,705,857 B1 * | 3/2004 | Paschereit et al. .......... 431/350 |
| 2002/0094687 A1 | 7/2002 | Kim et al. ................... 415/118 |

FOREIGN PATENT DOCUMENTS

EP    0 774 573 B1    2/2002

* cited by examiner

*Primary Examiner*—Charles G. Freay
(74) *Attorney, Agent, or Firm*—Sutherland Asbill & Brennan, LLP

(57) ABSTRACT

The present invention comprises systems and methods for detecting flame blowout precursors in combustors. The blowout precursor detection system comprises a combustor, a pressure measuring device, and blowout precursor detection unit. A combustion controller may also be used to control combustor parameters. The methods of the present invention comprise receiving pressure data measured by an acoustic pressure measuring device, performing one or a combination of spectral analysis, statistical analysis, and wavelet analysis on received pressure data, and determining the existence of a blowout precursor based on such analyses. The spectral analysis, statistical analysis, and wavelet analysis further comprise their respective sub-methods to determine the existence of blowout precursors.

27 Claims, 19 Drawing Sheets

SYSTEMS AND METHODS FOR DETECTION OF BLOWOUT PRECURSORS IN COMBUSTORS

RELATED APPLICATION DATA

The present application claims benefit of U.S. Provisional Application No. 60/391,748, titled "Acoustic Detection of Blowout Precursors in Pilot Stabilized Combustors," filed on Jun. 26, 2002 and U.S. Provisional Application No. 60/415,277, titled "Acoustic Detection of Blowout Precursors in Pilot Stabilized Combustors," filed on Oct. 1, 2002.

STATEMENT REGARDING FEDERALLY SPONSORED RESEARCH AND DEVELOPMENT

The U.S. Government has a paid-up license in this invention and the right in limited circumstances to require the patent owner to license others on reasonable terms as provided for by the terms of Contract No. E16-U68 awarded by the U.S. Department of Energy.

TECHNICAL FIELD

This invention relates to combustors in gas turbine engines, afterburners, industrial processing devices, and other combustor devices and more particularly, to detection of blowout precursors in such combustors.

BACKGROUND OF THE INVENTION

Combustors have long been used to burn a fuel/air mixture that is ultimately used to generate thrust, produce power, supply heat for some industrial process, or other applications. In these systems, an important performance metric is for the flame to remain stably in the combustor over a range of flow rates, pressures, and fuel/air ratios. At certain conditions, however, the flame may "blow out" of the combustor, so that no flame exists. The problem of blowout has long limited the allowable flow velocities through engines, particularly in systems such as gas turbines and afterburners which must operate at high flow rates and/or low pressures. The problem of blowout, however, has become increasingly more severe in a range of combustion devices, as they are required to meet stringent emissions legislation, severe operability constraints, and achieve better performance.

The problem of flame blowout can occur in combustors of land-based turbine engines, aeronautical turbine engines, afterburners, industrial processing devices, or any other combustor device. With respect to land-based turbine engines, operators of such engines attempt to run the engine near flame blowout conditions, known as the lean blowout line. An advantage of operating so close to the blowout line is that nitrous oxide emissions are significantly lowered. The trade-off, however, is an increased likelihood of blowing out of the flame. In the land-based systems, a blow out event requires a potentially lengthy system shut down and restart, resulting in economic consequences to the power plant owner when blowout is encountered.

In the aeronautical setting, blowout is a particular concern during fast engine transients, such as when rapid acceleration or deceleration of the engine is attempted. If the flame blows out in a commercial airplane, then there are obvious safety concerns for the passengers, though most engines can be re-ignited in-flight. However, because of the magnitude of the possible consequences, engine designers include substantial safety margins into the engines to avoid these events, often at the cost of reduced performance.

The need to avoid blowout in combustors often causes designers to sacrifice performance in other areas. In particular, because there is always some uncertainty in the exact conditions under which blowout may occur, extra margin must be built into the design. In such systems, performance could be improved and blowout better avoided if a method existed to monitor the proximity of the system to blowout.

A method designed to predict blowout conditions is U.S. Pat. No. 5,706,643 to Snyder et al. The Snyder patent discloses a method for predicting blowout conditions to minimize nitrous oxide emissions in land-based turbine engines. Snyder uses pressure measurements in the combustor to predict the onset of blowout conditions by analyzing pressure oscillations. The methods consist of monitoring the magnitude of the pressure, certain spectral components of the pressure, or the dominant frequency of the pressure. However, the methods rely on monitoring absolute magnitudes of the pressure signal, which may change on other engines, at different power settings, or due to inherent variability in pressure, temperature, or humidity of the air. As such, the methods reported by Snyder are designed to operate upon a particular engine at a particular operating condition. In addition, the dominant frequency may also change with engine type or operating conditions. Thus, the methods employed by Snyder are not robust and seemingly are operable only on the particular type of combustor tested and only under certain operating conditions. The methods taught by Snyder are not expansive to different combustor types operating in a wide array of environmental conditions.

Thus, there exists a need in the industry for a system and method for accurately predicting flame blowout conditions on different types of combustors operating in different environments.

SUMMARY OF THE INVENTION

The present invention comprises systems and methods for predicting and detecting flame blowout precursors in combustors. One embodiment of the present invention is a system for acoustic detection of blowout precursors. The system provides a combustor, a pressure measuring device in communication with the combustor, and a blowout precursor detection unit that receives the pressure signals and performs at least one of a spectral analysis, statistical analysis, and wavelet analysis to identify a blowout precursor. Another aspect of the present invention may combine a combustor controller with the system for acoustic detection of blowout precursors, which controls operation of the combustor based at least in part on detection of blowout precursor by the blowout precursor detection unit.

Another embodiment of the present invention is a method for detecting blowout precursors in combustors. The method provides for receiving pressure data measured by an acoustic pressure device associated with the combustor, performing spectral analysis on the pressure data using Fourier transform analysis, performing statistical analysis on the pressure data using statistical moments, performing wavelet analysis on the pressure data using wavelet transform analysis, and determining the existence of a blowout precursor based on one or more of the spectral analysis, statistical analysis, and wavelet analysis techniques.

Yet another embodiment of the present invention is a method for detecting blowout precursors in combustors that provides for receiving pressure data measured by an acoustic pressure device associated with a combustor, performing spectral analysis on the pressure data using Fourier transform analysis, and determining the existence of a blowout precursor based on the spectral analysis. One aspect of the present invention provides for calculating a Fourier transform of at least part of the pressure data, and calculating a power ratio of power in a frequency range normalized by total spectral power. The existence of a blowout precursor may be detected by monitoring a predefined change in the power ratio. A similar aspect of the present invention may calculate a ratio of power at a specific frequency normalized by total spectral power. The existence of a blowout precursor may be detected by monitoring a predefined change in that power ratio as well.

Another embodiment of the present invention includes a method for determining blowout precursors in combustors based on receiving pressure data measured by an acoustic pressure of a combustor, performing statistical analysis on the pressure data using statistical moments, and determining the existence of a blowout precursor based on the statistical analysis. The statistical analysis can also be performed on at least a part of the pressure data. Another aspect of the method includes determining the existence of a blowout precursor based on a predefined change in a magnitude of the statistical moment. Yet another aspect of the method provides for calculating a variance of the statistical moment of the pressure data. The variance may be monitored for predefined changes to determine blowout precursors. Another aspect of this method provides for dividing the statistical moment pressure data into a plurality of time segments and defining a statistical moment threshold. The existence of a blowout precursor may be detected based on a number of instances in a given time segment that the statistical moment exceeds the statistical moment threshold and also based on a total time in a given time segment that the statistical moment exceeds the statistical moment threshold.

Yet another embodiment of the present invention provides for a method of determining blowout precursors in combustors based on receiving pressure data measured by an acoustic pressure device associated with the combustor, performing wavelet analysis on the pressure data, and determining the existence of a blowout precursor from the results of the wavelet analysis. The method further provides defining a root mean square of the wavelet transform and calculating a ratio of the root mean square of the wavelet transform of the pressure data to the root mean square of pressure data. Determination of the existence of a blowout precursor may be based on a predefined change in the ratio.

Further aspects of the method may include determining the existence of a blowout precursor based on a number of instances in a given time segment that the wavelet transform of the pressure data exceeds a threshold or based on a total time in a given time segment that the wavelet transform of the pressure data exceeds the wavelet transform threshold.

This method may further include computing statistical moment data from the wavelet transform of the pressure data. Determination of the existence of blowout precursors may be based on a predefined change in magnitude of the statistical moment data.

The method also may include dividing the pressure data into time segments and calculating a variance of the statistical moment of each segment. A predefined change in the variance may indicate blowout conditions.

BRIEF DESCRIPTION OF DRAWINGS

Figure 1:
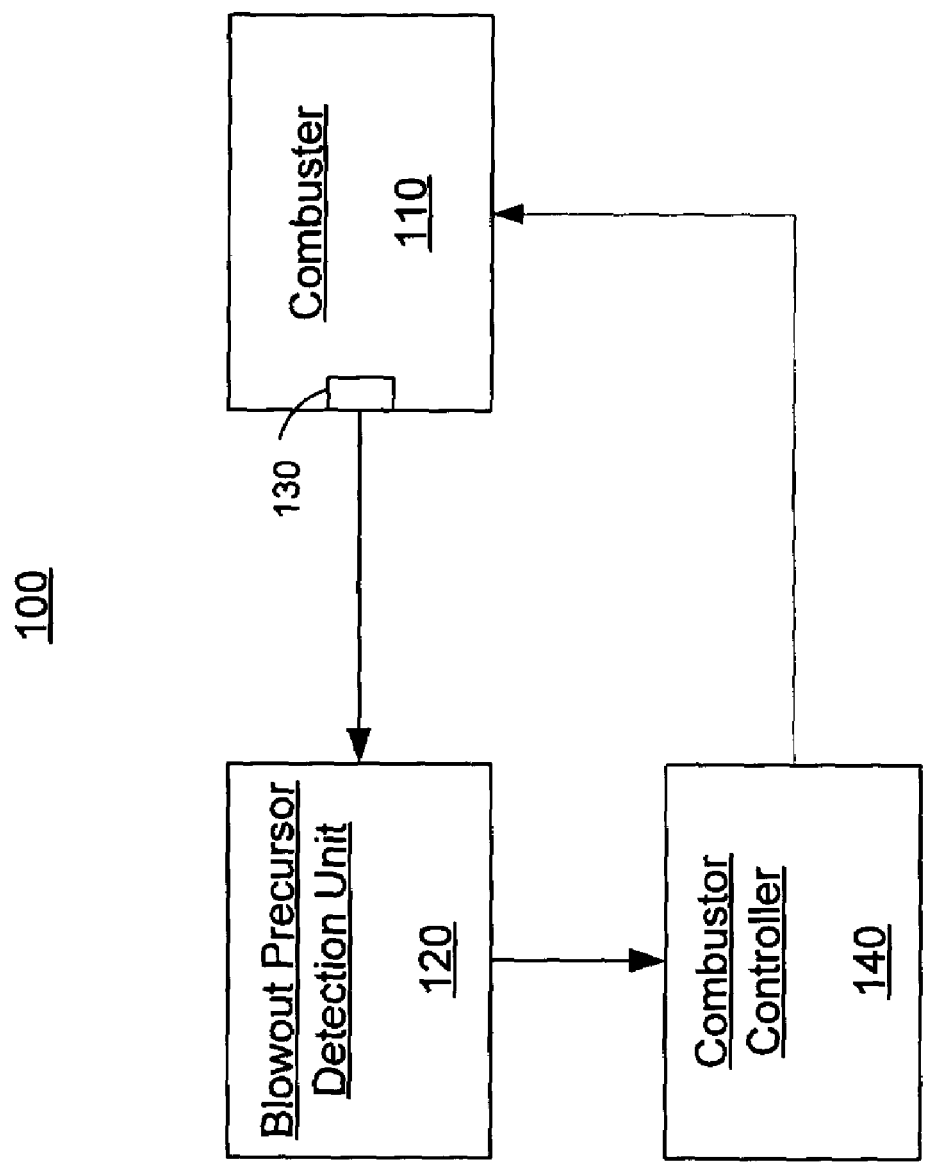

Having thus described the invention in general terms, reference will now be made to the accompanying drawings, which are not necessarily drawn to scale, and wherein:

FIG. 1 is a block diagram illustrating the basic components of the blowout precursor detection system.

Figure 2:
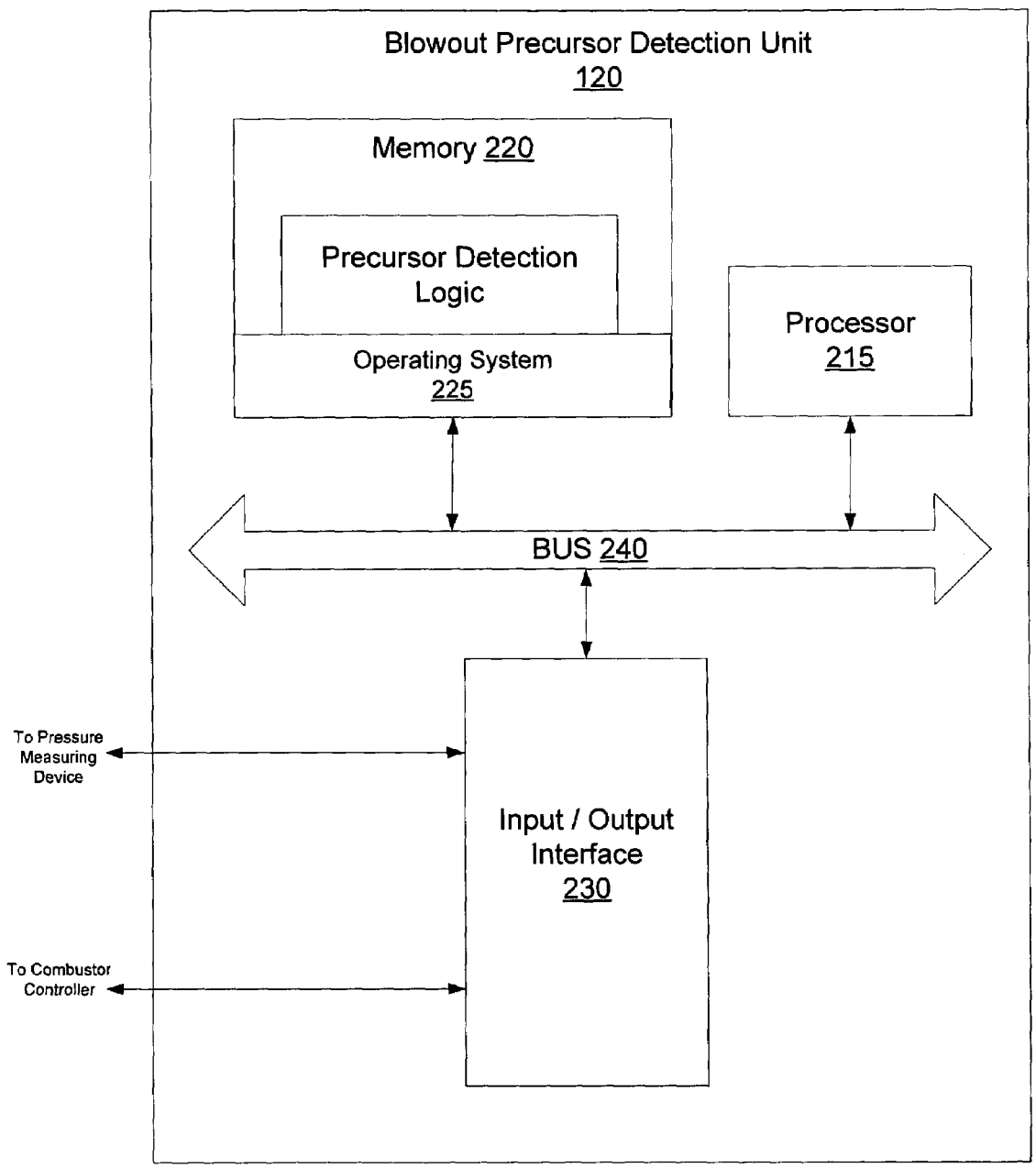

FIG. 2 is a block diagram illustrating the basic components of the blowout precursor detection unit.

Figure 3:
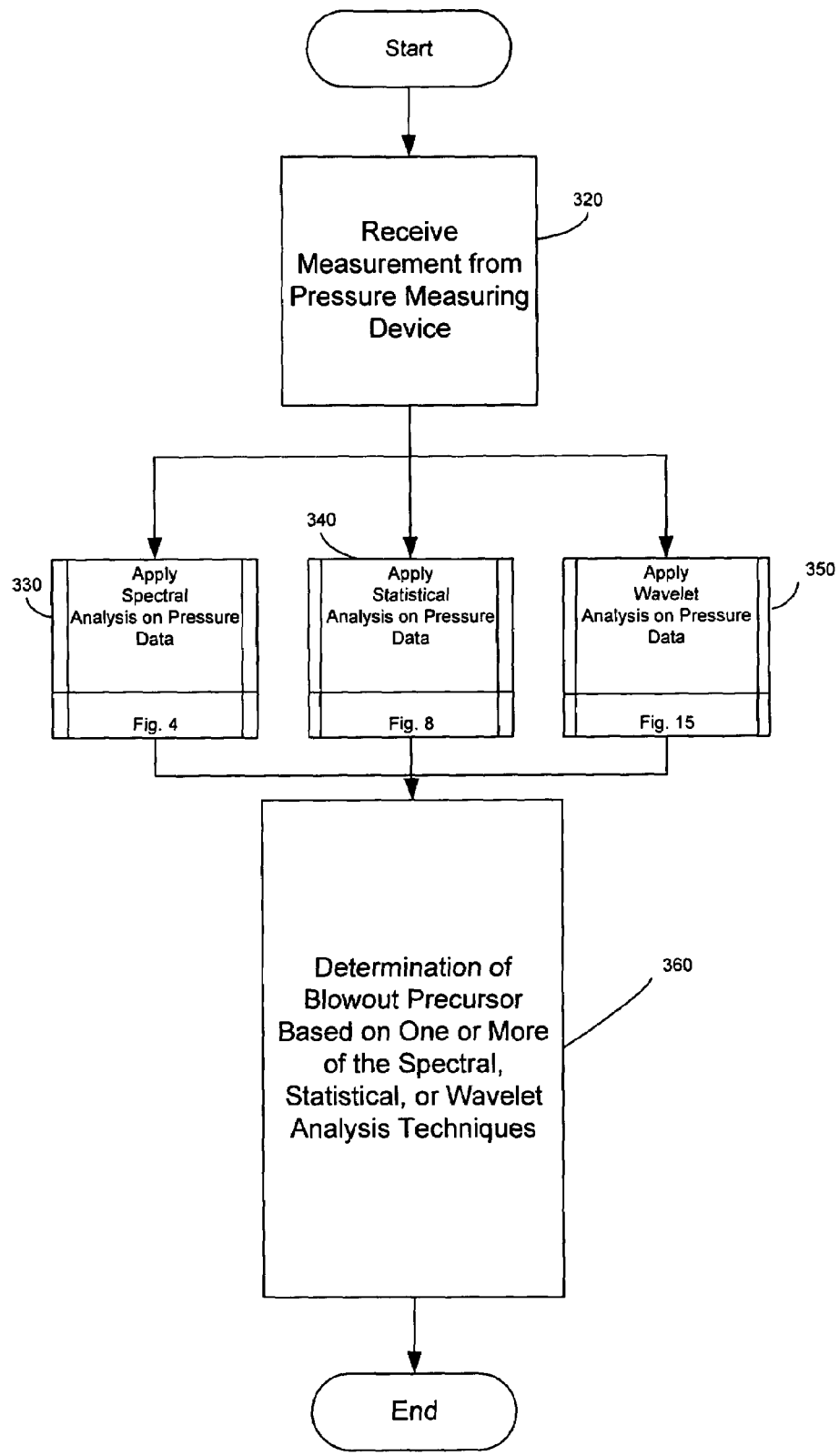

FIG. 3 is a block diagram of the method of detecting blowout precursors, according to one aspect of the present invention.

Figure 4:
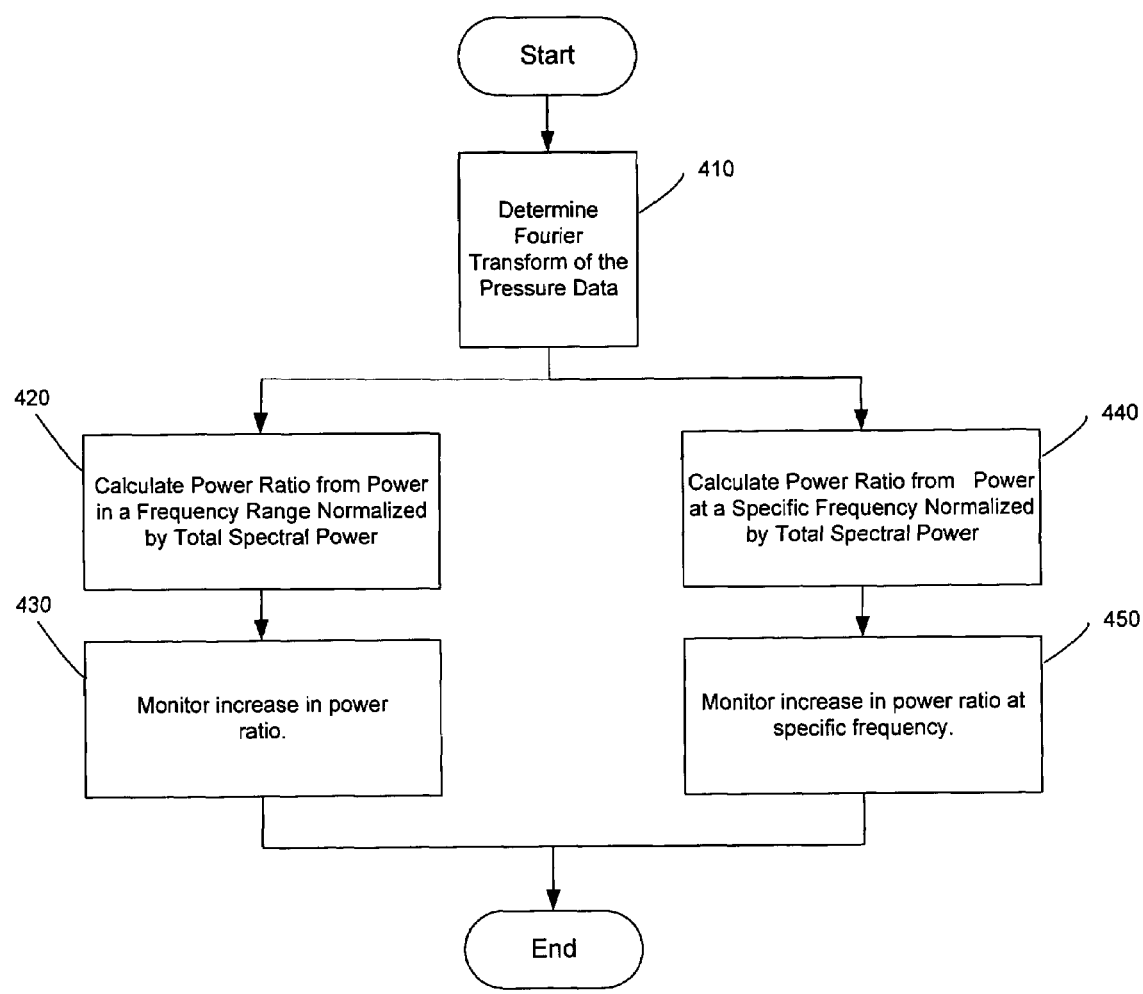

FIG. 4 is a block diagram of the method of detecting blowout precursors using spectral analysis, according to one aspect of the present invention.

Figure 5:
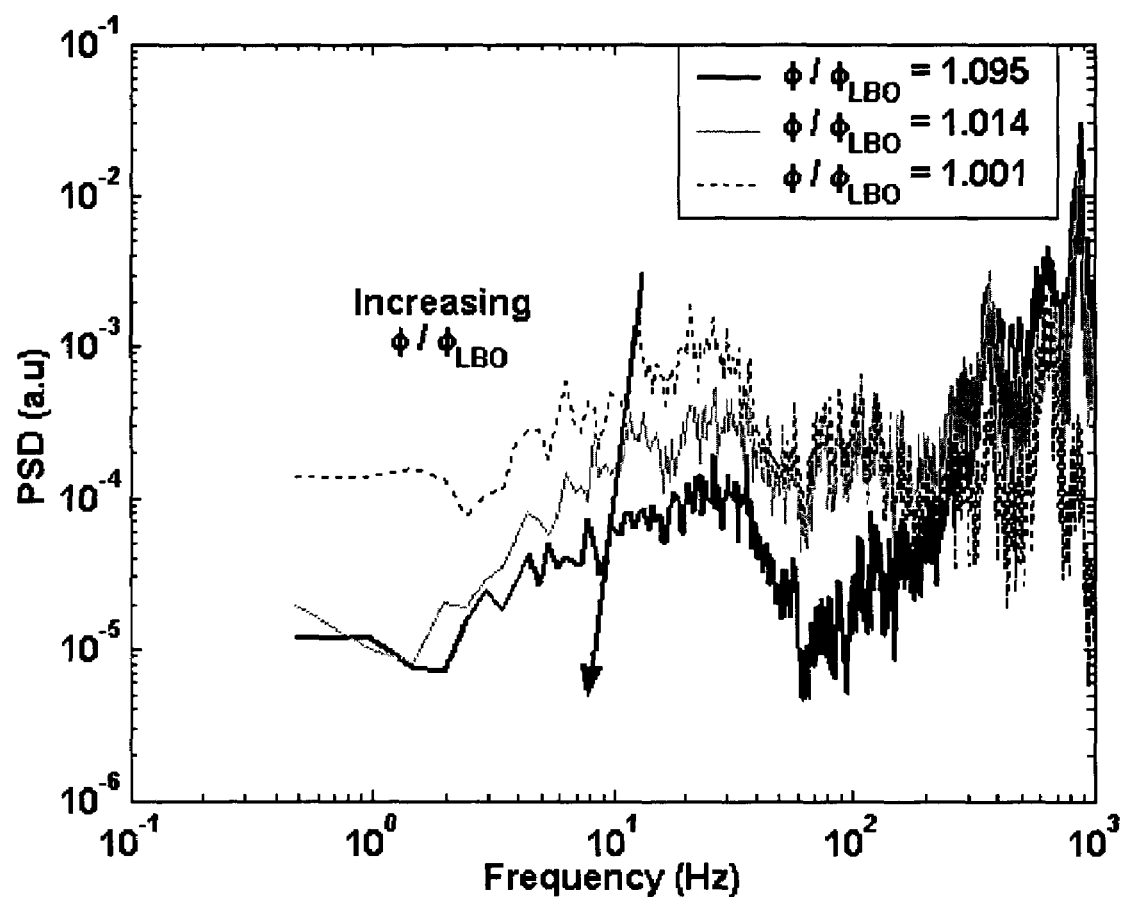

FIG. 5 is a plot of Fourier Transformed pressure data.

Figure 6:
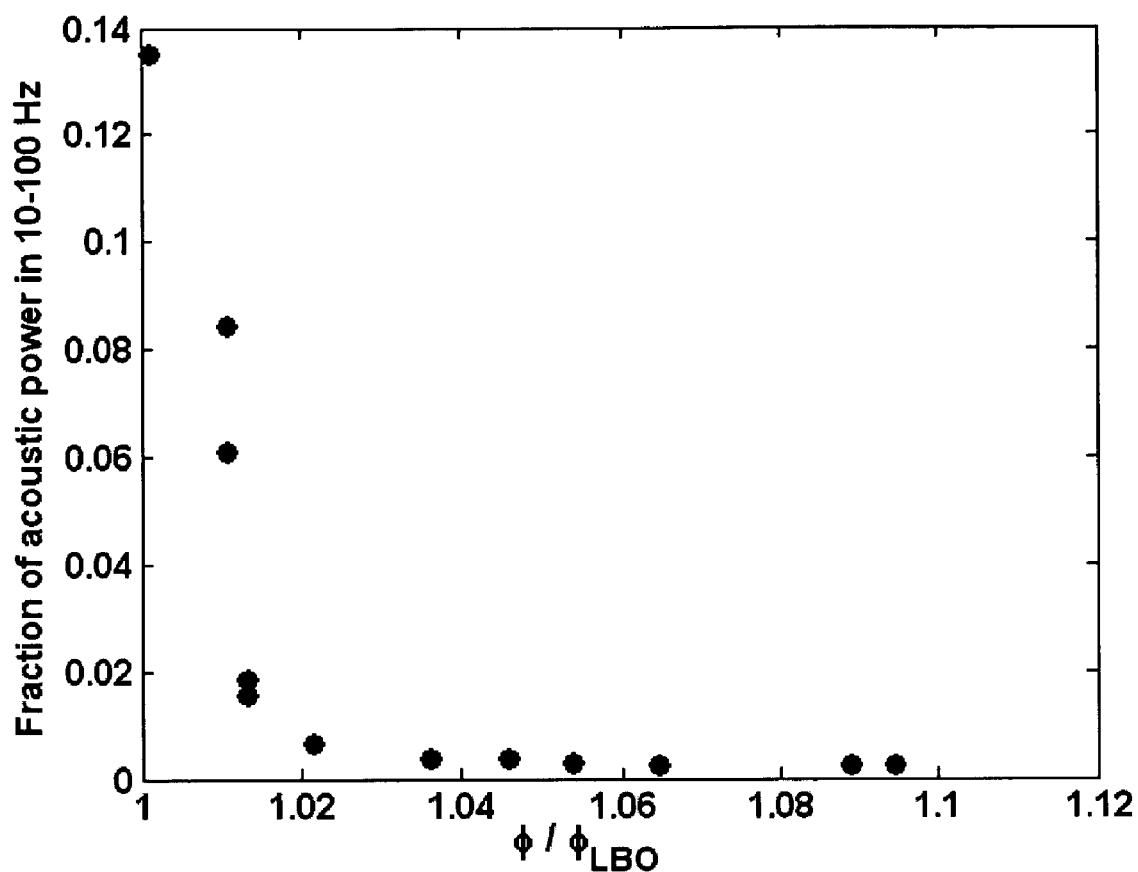

FIG. 6 is a plot of Fourier Transformed pressure data as analyzed in the first sub-method of the spectral analysis.

Figure 7:
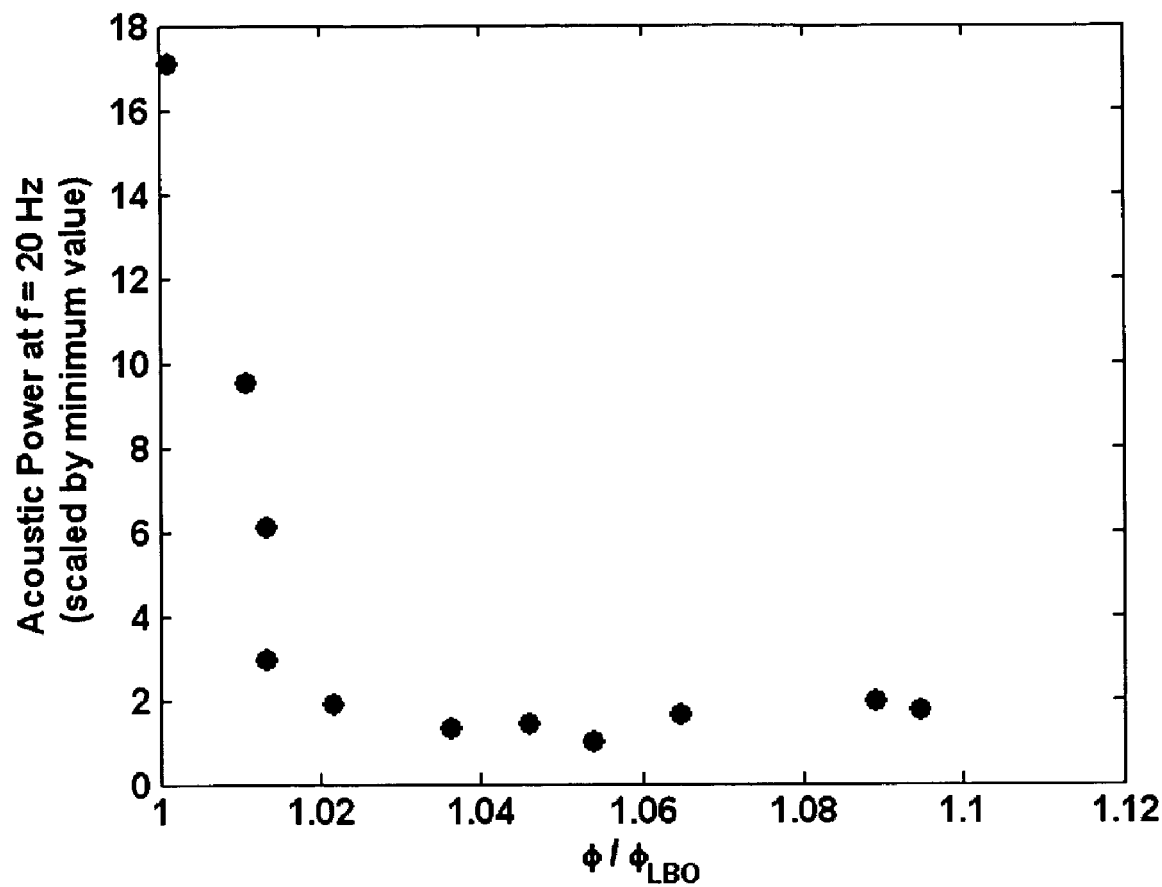

FIG. 7 is a plot of Fourier Transformed pressure data as analyzed in the second sub-method of the spectral analysis.

Figure 8:
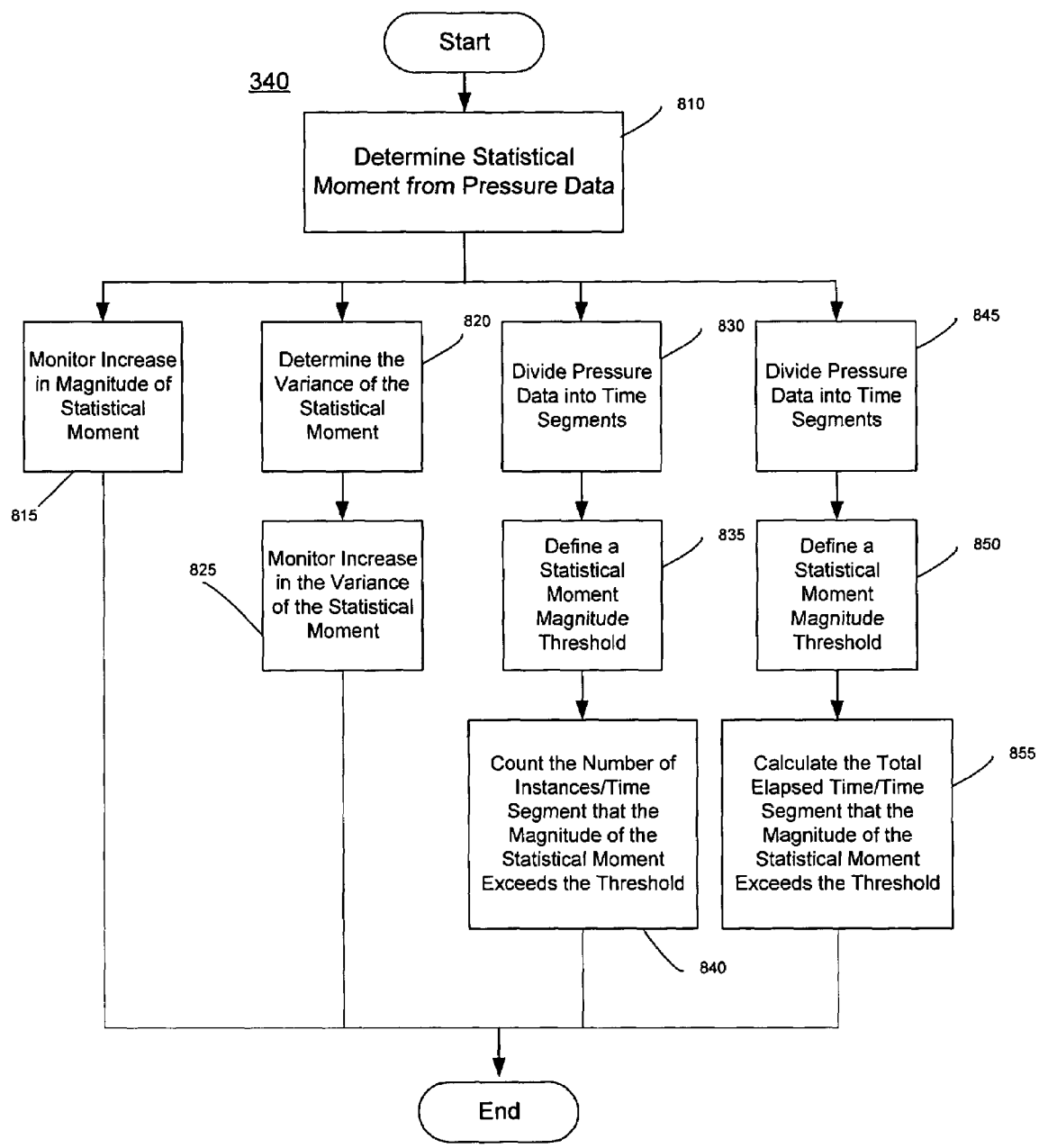

FIG. 8 is a block diagram of the method of detecting blowout precursors using statistical analysis, according to one aspect of the present invention.

Figure 9:
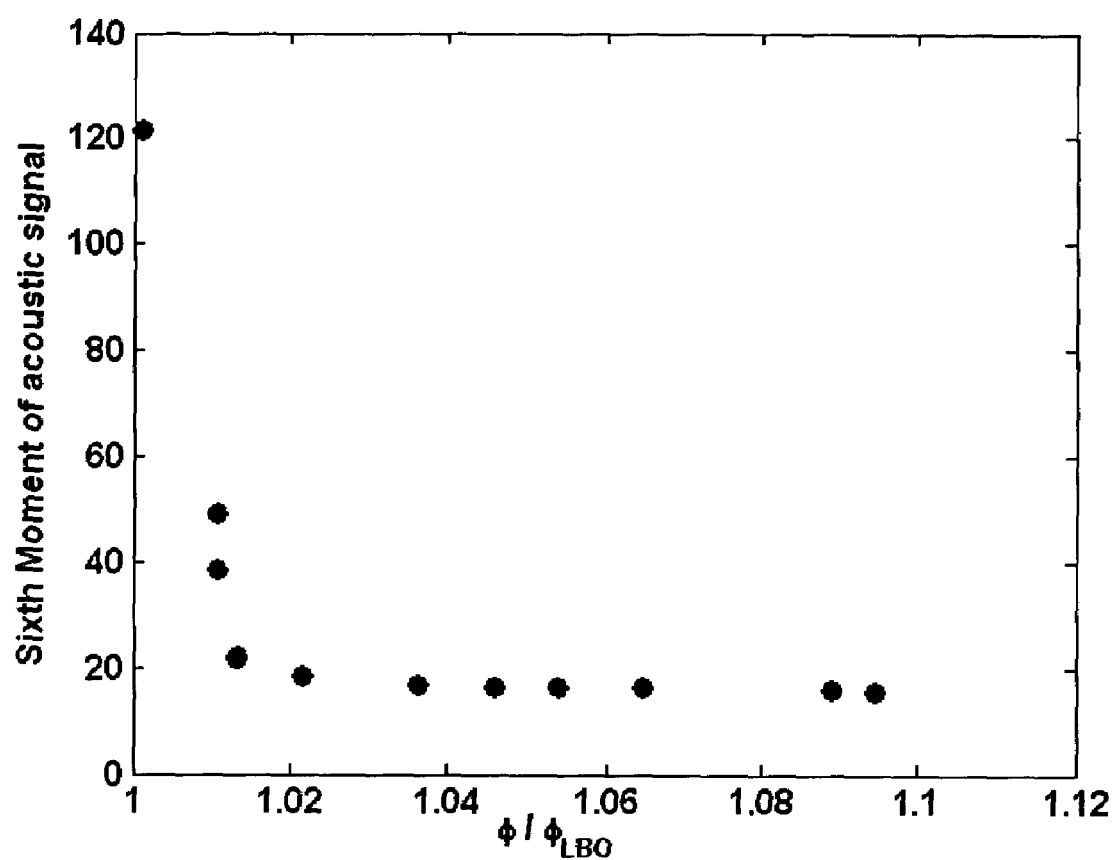

FIG. 9 is a plot of the $6^{th}$ statistical moment of the pressure data.

Figure 10:
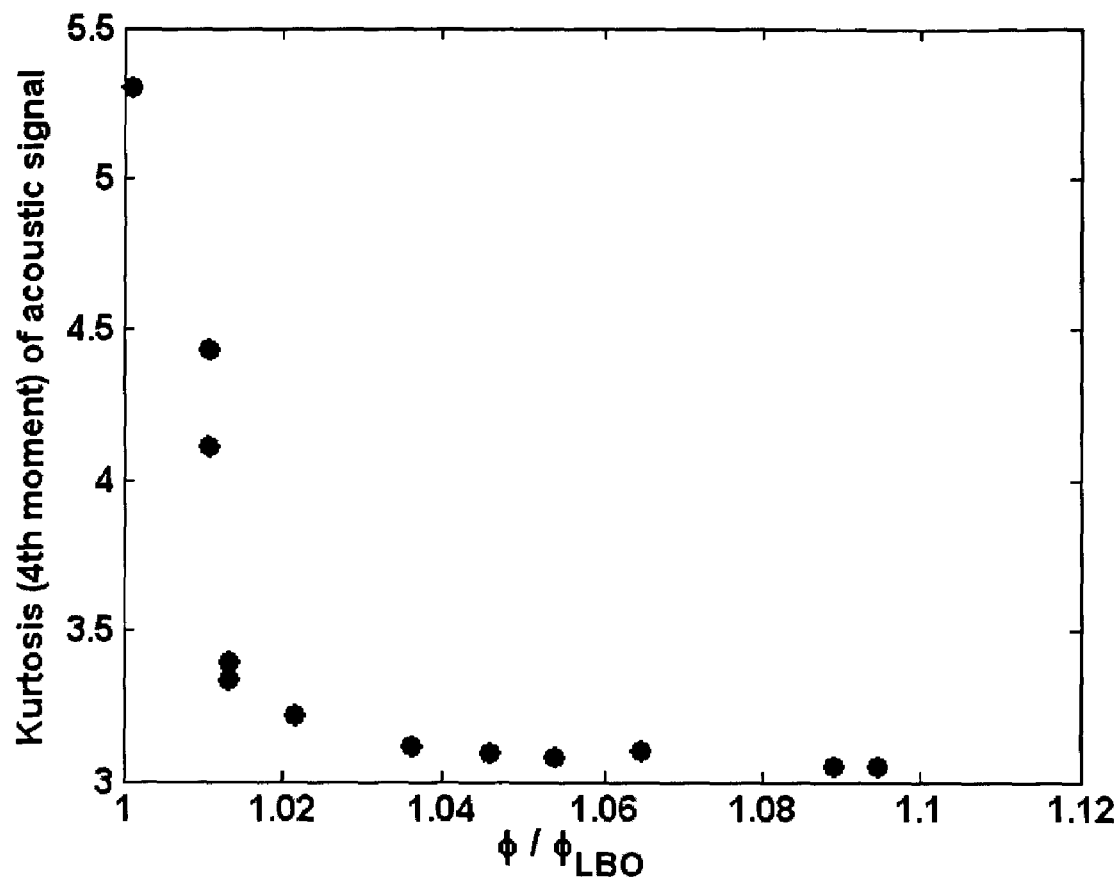

FIG. 10 is a plot of the statistical moment of the pressure data as analyzed in the first sub-method of the statistical analysis.

Figure 11:
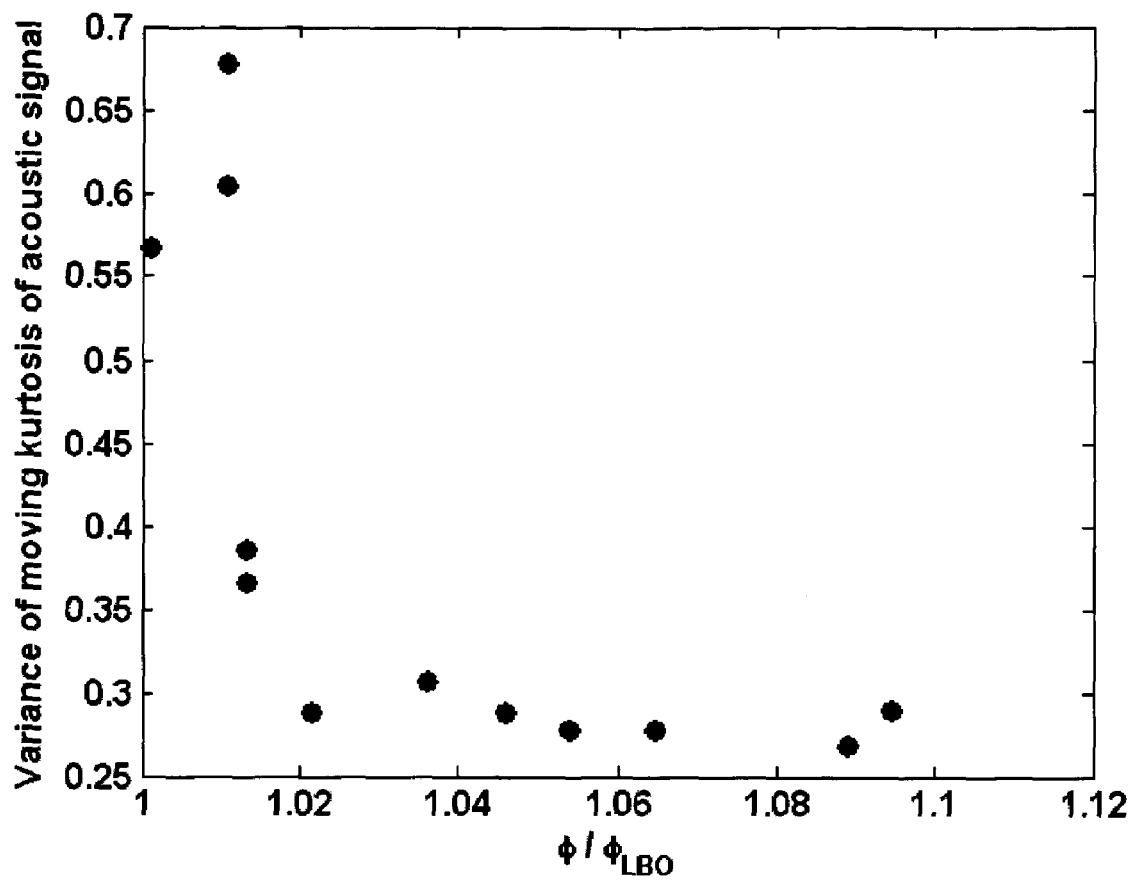

FIG. 11 is a plot of the statistical moment of the pressure data as analyzed in the second sub-method of the statistical analysis.

Figure 12:
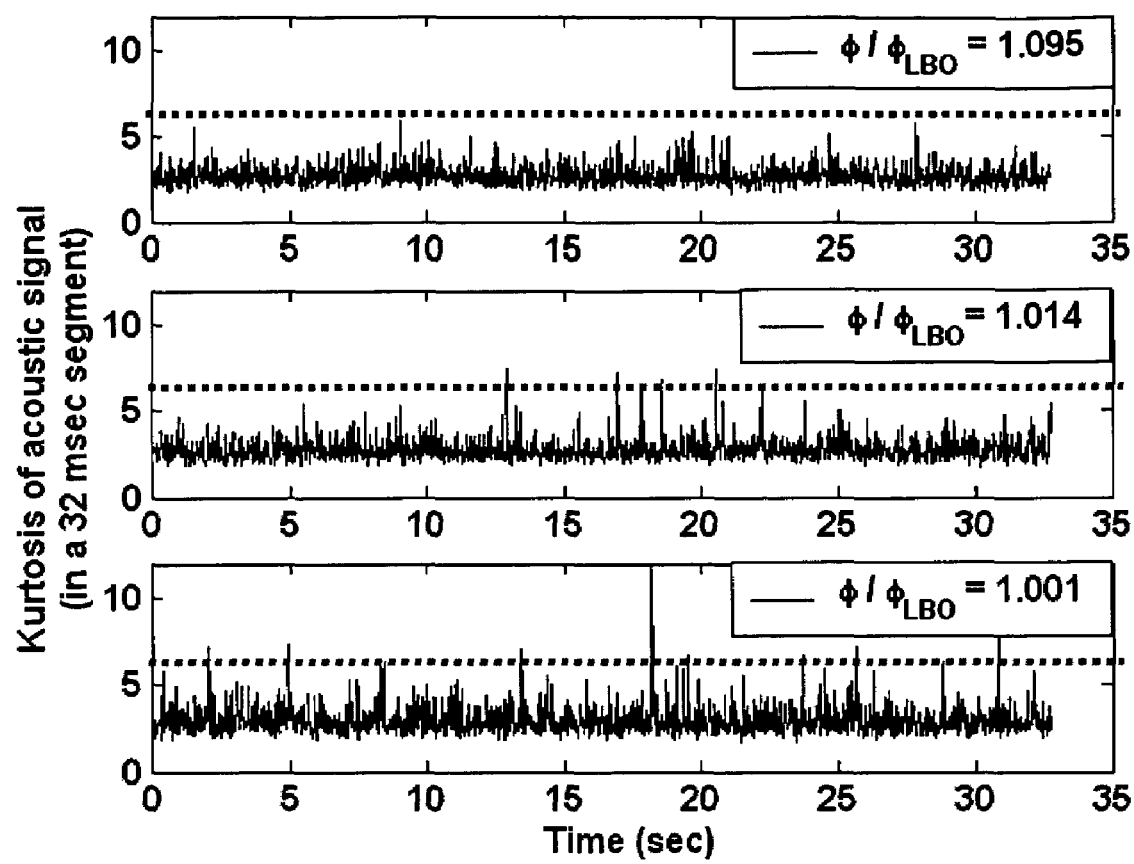

FIG. 12 is a plot of the statistical moment of the pressure data as analyzed in the third sub-method of the statistical analysis.

Figure 13:
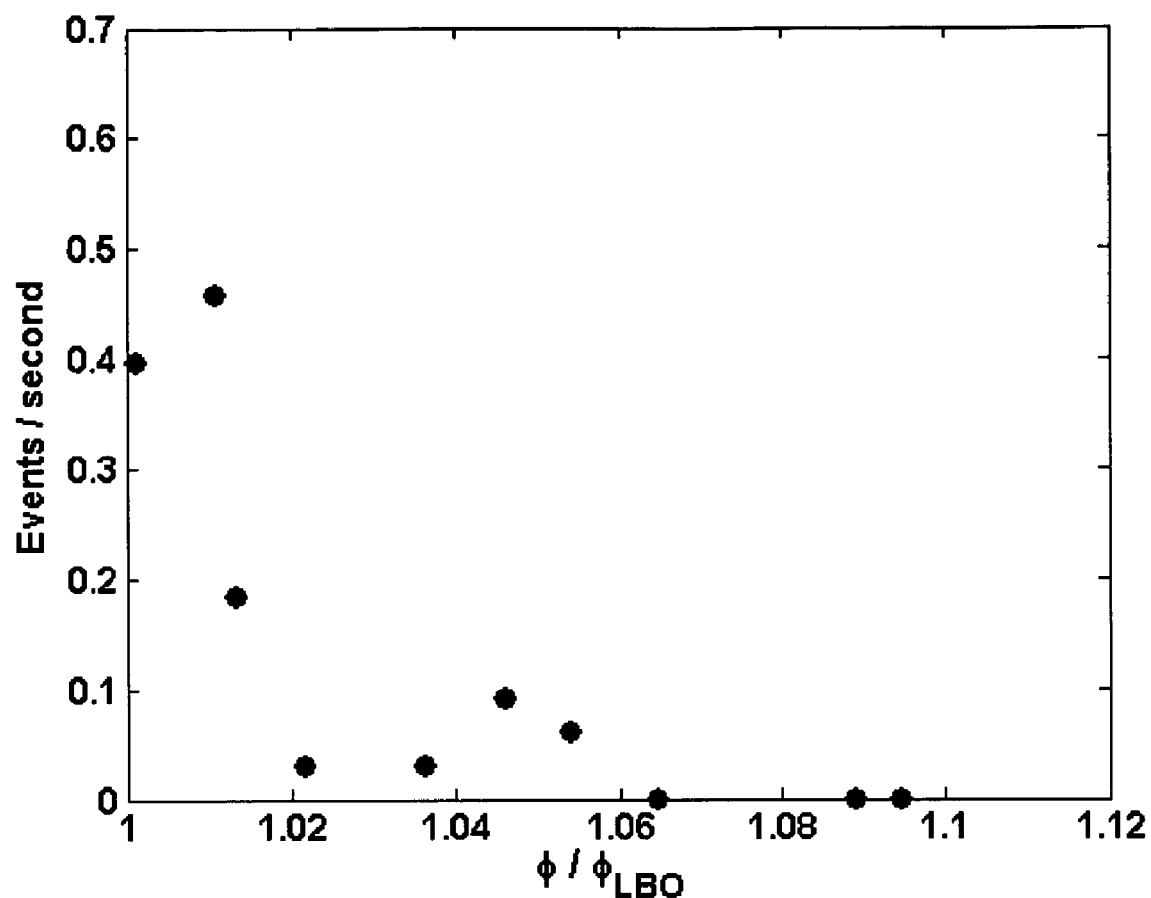

FIG. 13 is a plot of the statistical moment of the pressure data as analyzed in the third sub-method of the statistical analysis.

Figure 14:
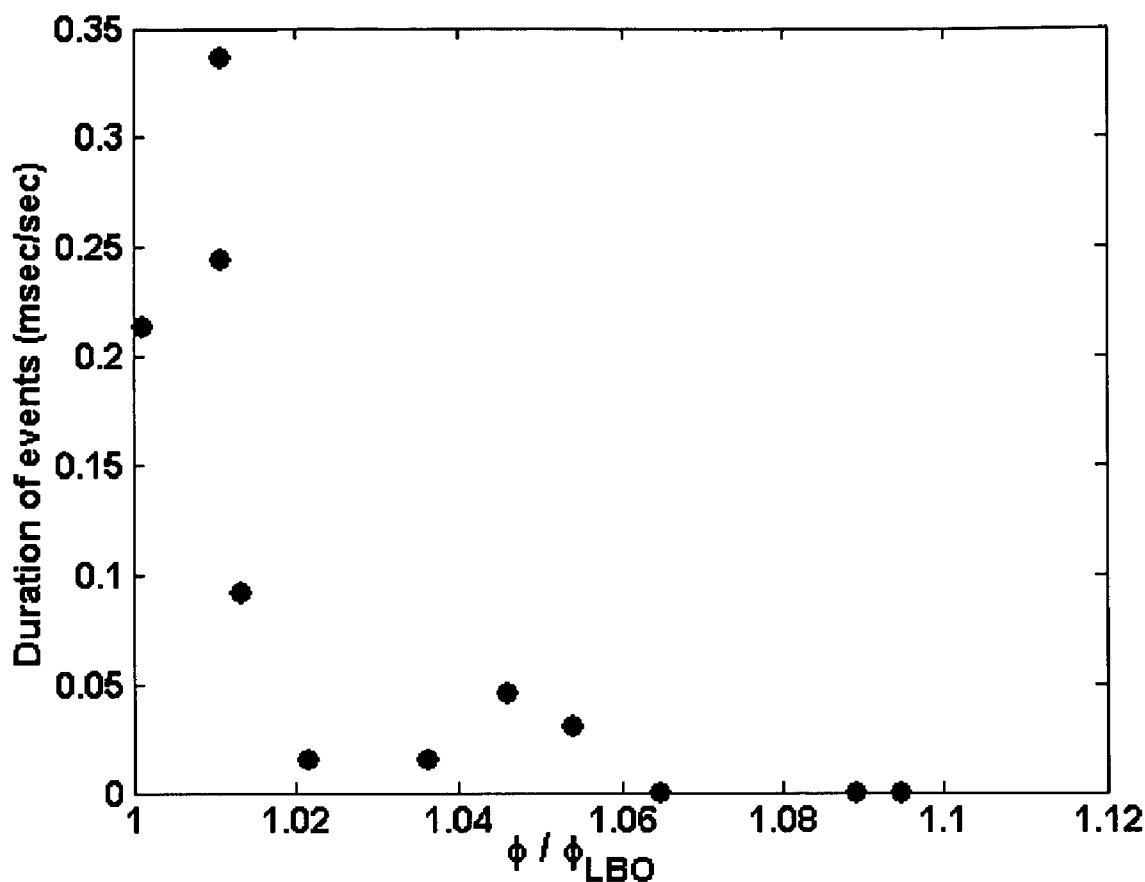

FIG. 14 is a plot of the statistical moment of the pressure data as analyzed in the fourth sub-method of the statistical analysis.

Figure 15:
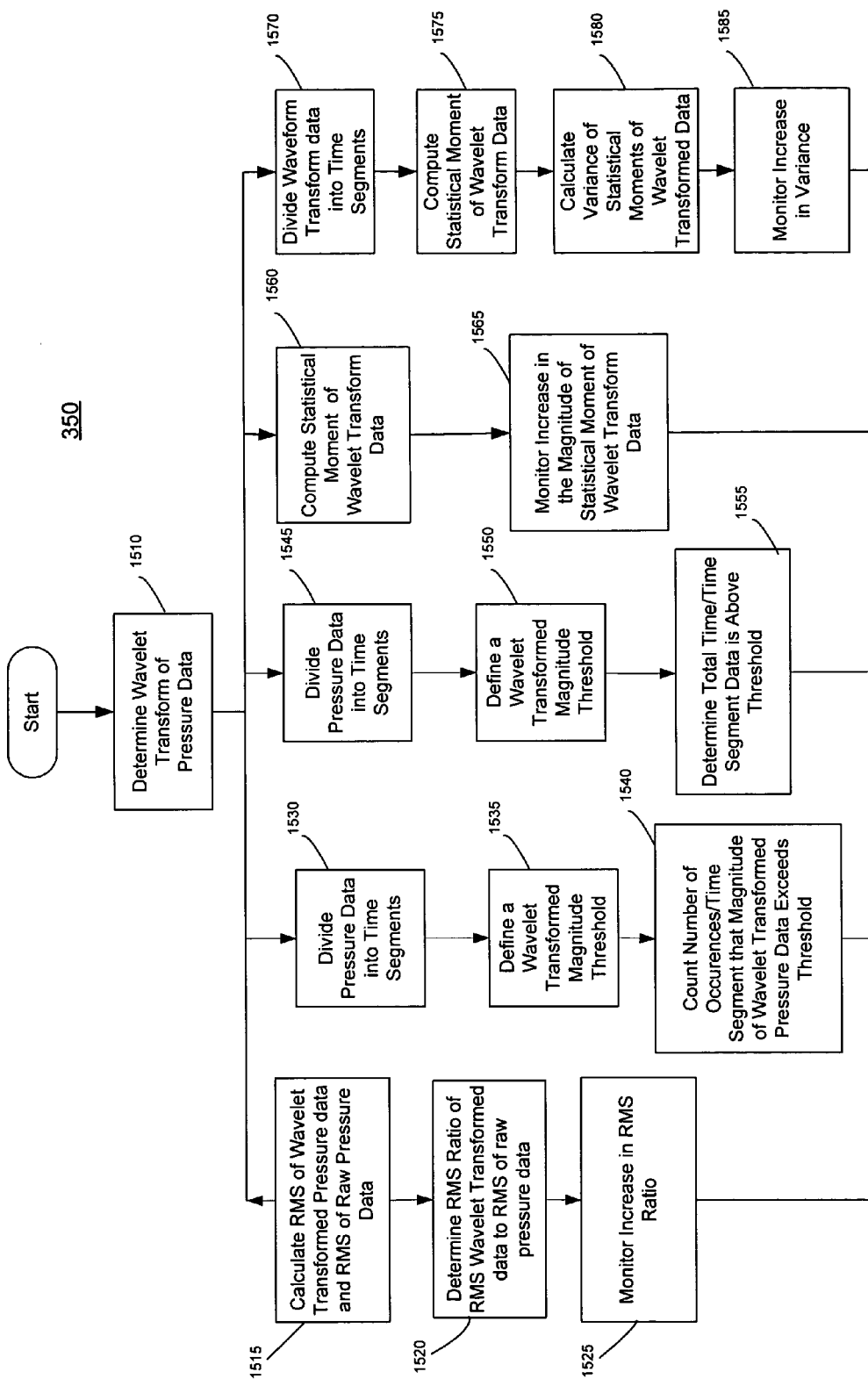

FIG. 15 is a block diagram of the method of detecting blowout precursors using wavelet analysis, according to one aspect of the present invention.

Figure 16:
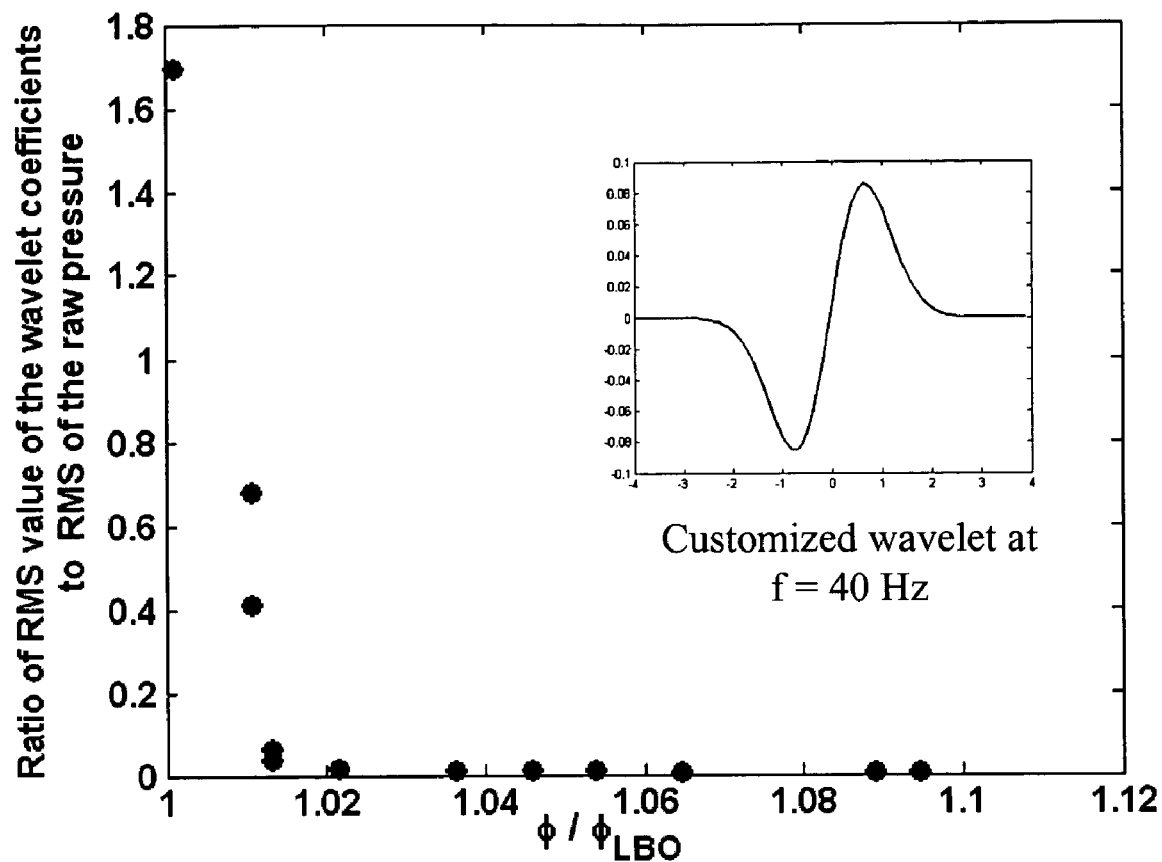

FIG. 16 is a plot of the RMS ratio of the pressure data as analyzed in the first sub-method of the wavelet analysis, according to one aspect of the present invention.

Figure 17:
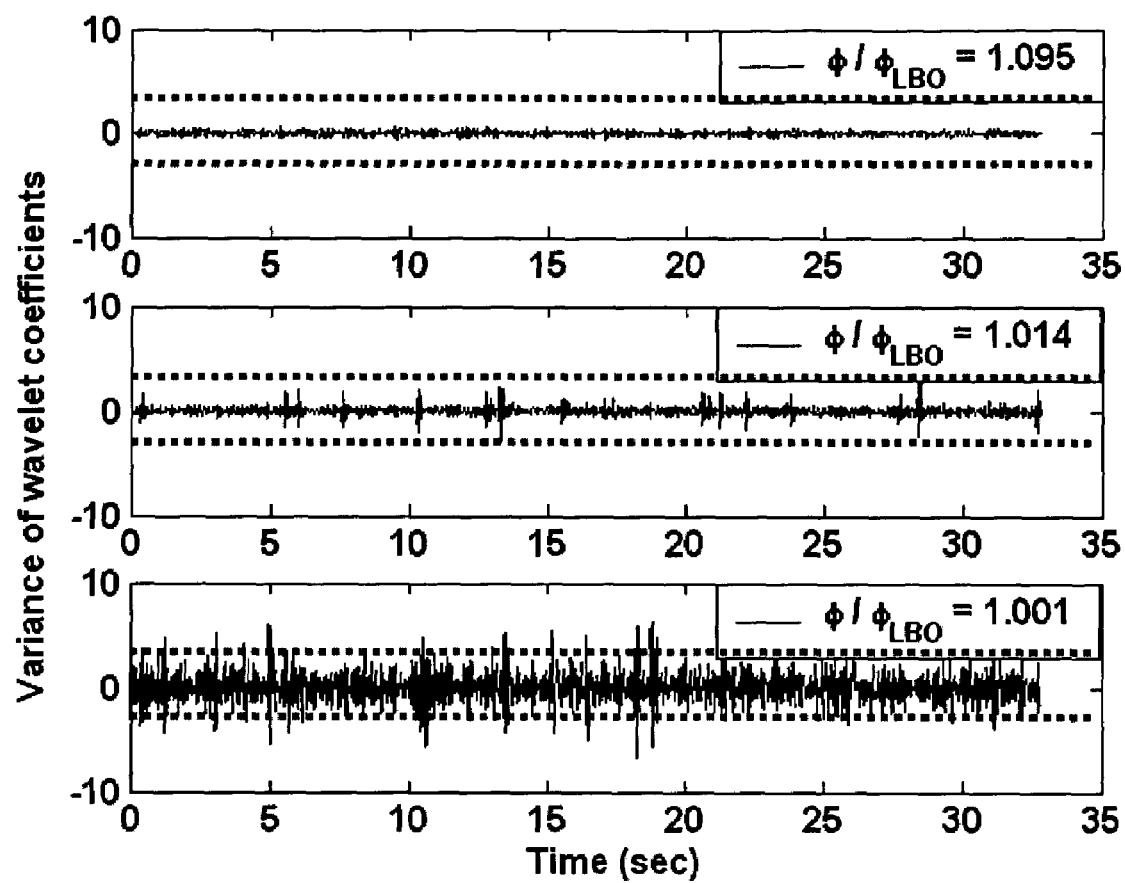

FIG. 17 is a plot of the magnitude of the wavelet transformed pressure data as analyzed in the second sub-method of the wavelet analysis, according to one aspect of the present invention.

Figure 18:
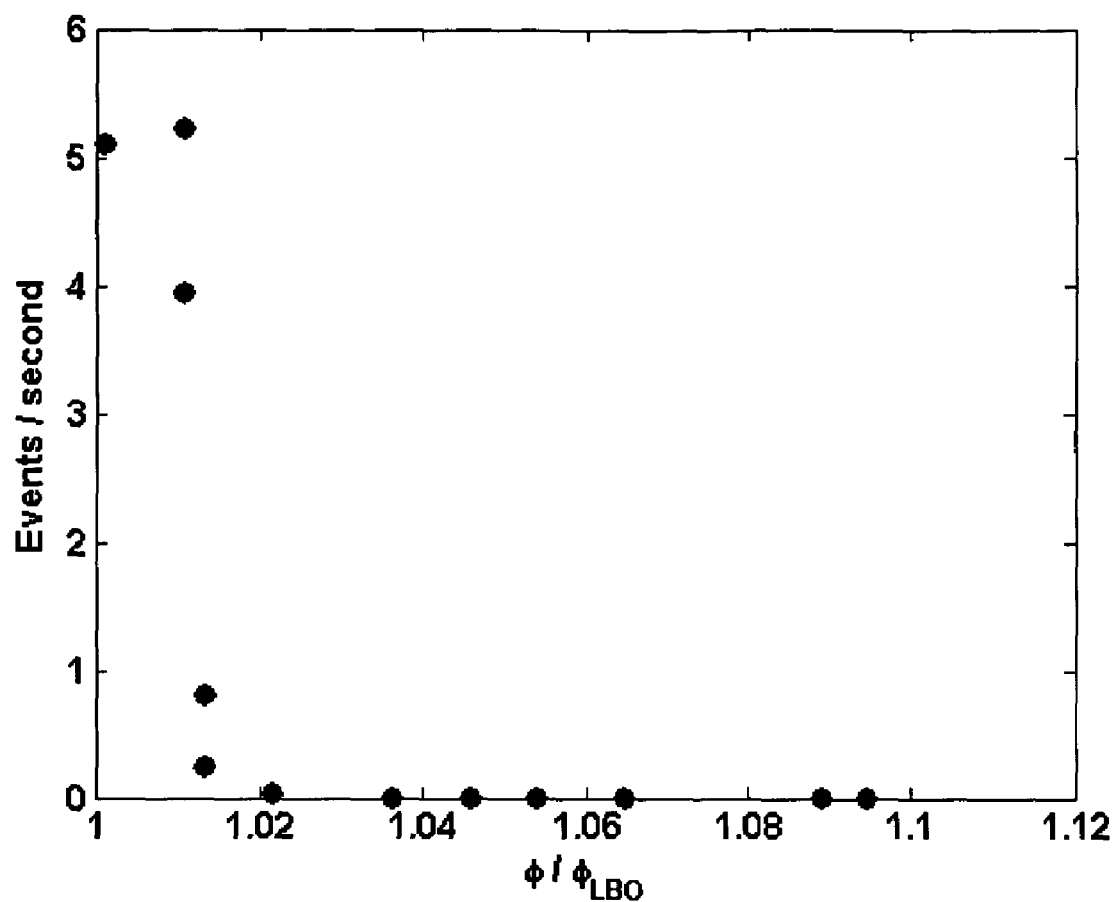

FIG. 18 is a plot of the magnitude of the wavelet transformed pressure data as analyzed in the second sub-method of the wavelet analysis, according to one aspect of the present invention.

Figure 19:
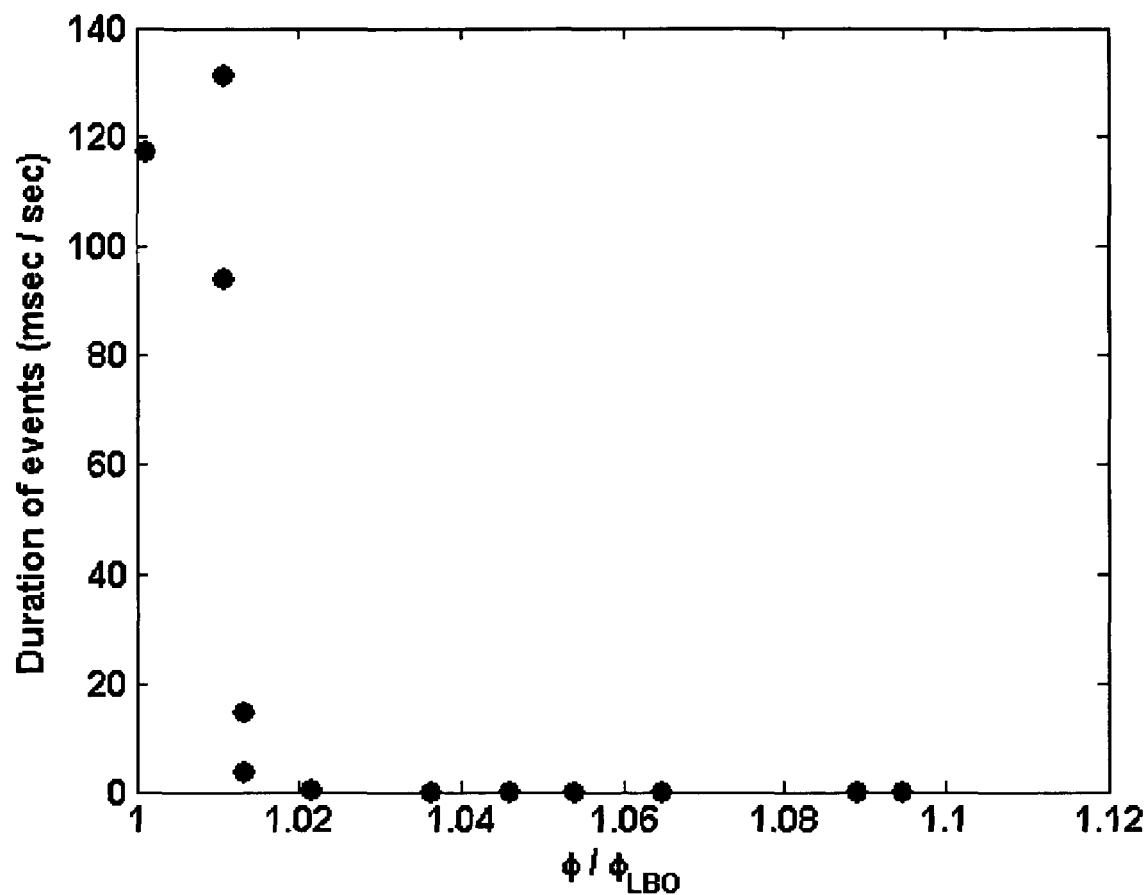

FIG. 19 is a plot of the magnitude of the wavelet transformed pressure data as analyzed in the third sub-method of the wavelet analysis, according to one aspect of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention is described below with reference to block diagrams and flowchart illustrations of systems, methods, apparatuses and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present invention comprises systems and methods for accurately and robustly predicting flame blowout precursors for combustors. The present invention is applicable to all types of combustors and is designed to operate over a diverse range of environmental condition, including varying temperatures, humidity, air compositions, and fuel compositions.

Exemplary embodiments of the present invention will hereinafter be described with reference to the figures, in which like numerals indicate like elements throughout the several drawings. FIG. 1 illustrates a combination system 100 in accordance with the present invention. Advantageously, the present invention can be utilized with different types of combustors. Combustors applicable to this invention include but are not limited to combustors such as those found in industrial systems, land based or aeronautical gas turbine engines, afterburners, or ramjets. The design of the combustor and its disposition in an engine casing is well known to those skilled in the art and is in no way limited to the examples enumerated herein.

For purposes of illustrating the present invention, the combustion system 100 comprises a combustor 110 that is generally designed to receive compressed air from a compression section and fuel from fuel nozzles. The air and the fuel mix and burn to operate the engine. Combustors can be of any shape or configuration.

The combustion system further includes a blowout precursor detection unit 120, a pressure measuring device 130, and a combustor controller 140. The blowout precursor detection unit 120 identifies precursors that indicate that the flame in a combustor 100 is near blowout. By identifying the blowout precursors one can prevent the flame from actually blowing out by making appropriate adjustments.

The pressure measuring device 120 is coupled to the combustor 110 and configured to detect the pressure in the combustor 110. The pressure measuring device 110 may be a pressure transducer or any other suitable device that accurately measures pressure and may be either analog or digital. In an exemplary embodiment, the pressure measuring device 130 is a pressure transducer capable of measuring pressure oscillations up to roughly 5 KHz. The pressure measuring device 130 may be mounted in the combustor, tangential to the combustor, or any other acoustically acceptable location that sufficiently measures the combustor pressure. The pressure measuring device 130 also may be attached to a stand-off tube that may be mounted into the combustor 110 and extend out of the combustor 110.

The blowout precursor detection unit 120 is connected with the pressure measuring device 130. FIG. 2 shows a block diagram illustrating components comprising a blowout precursor detection unit 120 of the combustion system 100, according to one aspect of the present invention. The blowout precursor detection unit 120 is preferably configured with operator interface for enabling the blowout precursor detection unit 120 to accept system setup information, input threshold settings and additional information applicable to blowout precursor detection. Alternatively, such information may be inputted by other suitable means, such as the combustion controller 140. The blowout precursor detection unit 120 is designed to receive pressure data from the pressure measuring device 130 and based thereon detect the existence of blowout precursors through one or more of the signal analysis methods described in FIGS. 3–19 and the accompanying text.

According to an exemplary embodiment of the present invention, the blowout precursor detection unit 120 comprises software running on a microprocessor or other suitable computing device. The blowout precursor detection unit 120 may be embodied as a method, a data processing system, or a computer program product. Accordingly, the blowout precursor detection unit 120 may take the form of an entirely hardware embodiment, an entirely software embodiment or an embodiment combining software and hardware aspects. Furthermore, the blowout precursor detection unit 120 may take the form of a computer program product on a computer-readable storage medium having computer-readable program code means embodied in the storage medium. Any suitable computer-readable storage medium may be utilized including hard disks, CD-ROMs, optical storage devices, or magnetic storage devices.

As shown in FIG. 2, the blowout precursor detection unit 120 comprises a processor 215, a memory 220, an operating system 225, an input/output interface 230 and a database 235, all in communication via a local interface 240. Briefly, the processor 215 executes the operating system 220, which controls the execution of other program code such as that comprising the signal processing logic 235 for implementing the functionality described herein. The local interface 240 may be, for example but not limited to, one or more buses or other wired or wireless connections. The local interface 240 may have additional elements, which are omitted for simplicity, such as controllers, buffers (caches), drivers, repeaters, and receivers, to enable communications. Furthermore, the local interface 240 may include address, control, and/or data connections to enable appropriate communications among the aforementioned components.

The processor 215 is a hardware device for executing software, particularly that stored on memory 220. The processor 215 may be any custom-made or commercially-available processor, a central processing unit (CPU), and auxiliary processor among several processors associated with the system 100 a semi-conductor based microprocessor (in the form of a microchip or chip set), a macroprocessor, or generally any device for executing software instructions.

The memory 220 may comprise an operating system 225 and the signal processing logic 235. The architecture, operation, and/or functionality of signal processing logic 235 will be described in detail below. The memory 220 may include any one or combination of volatile memory elements (e.g., random access memory (RAM), such as DRAM, SRAM, SDRAM, etc.) and non-volatile memory elements (e.g., ROM, hard drive, tape, CD-ROM, etc.). The memory 220 may incorporate electronic, magnetic, optical and/or other types of storage media. Furthermore, memory 220 may have a distributed architecture, in which various components are situated remote from one another, but can be accessed by processor 215.

The software in memory 220 may include one or more separate programs, each of which comprising executable instructions for implementing logical functions. In the example of FIG. 2, a software in memory 220 includes the signal processing logic 235 according to the present invention. The memory 220 may further comprise a suitable operating system 225 that controls the execution of other computer programs, such as the signal processing logic 235, and provides scheduling, in-output control file and data management, memory management, and communication control and related services.

The input/output interfaces 230 may be any device or devices configured to facilitate communication with the blowout precursor detection unit 120. The communications can be with a communication network, such as a public or private packet-switched or other data network including the Internet, a circuit switched network, such as the public switch telephone network, a wireless network, an optical network, or any other desired communication infrastructure. Alternatively, the input/output interfaces may also include any one of the following or other devices for facilitating communication with local interface 240: a user interface device such as a keyboard or mouse, a display device such as a computer monitor, a serial port, a parallel port, a printer, speakers, a microphone, etc. During operation of the blowout precursor detection unit 120, a user may interact with the signal processing logic 235 via such user interface and display devices.

The signal processing logic 235 may be a source program, executable program (object code), script, or any other entity comprising a set of instructions to be performed. When implemented as a source program, then the program needs to be translated via a compiler, assembler, interpreter, or like, which may or not be included within the memory 220, so as to operate properly in connection with the operating system 225. Furthermore, the signal processing logic 235 may be written as an object oriented program language, which has classes of data and methods, or a procedure program language, which has routines, sub-routines, and/or functions, for example but not limited to, C++, Pascal, Basic, Fortran, Cobol, Perl, Java, and Ada.

It will be appreciated by one of ordinary skill in the art that one or more of the blowout precursor detection unit 120 components may be located geographically remotely from other blowout precursor detection unit 120 components. Furthermore, one or more of the components may be combined, and additional components performing functions described herein may be included in the blowout precursor detection unit 120. In addition, one or more, if not all, of the components of the blowout precursor detection unit 120 may be incorporated into the combustor controller 140.

The blowout precursor detection unit 120 is configured to receive through the input/output interface 230 pressure data captured by the pressure measuring device 130. As discussed in regards to FIGS. 3–19, the signal processing logic 235 utilizes one or more signal processing methods to analyze the pressure data for the detection of a blowout precursor. The signal processing logic 235 may include hard-coded threshold values for blowout precursor detection or may use input threshold values inputted into the memory 220 through the input/output interface 230. The detection of a blowout precursor results in a signal being communicated to the combustion controller 140 that indicates that the flame is near blowout conditions.

The combustion controller 140 controls the operation of the combustor 110 and is in communication with the blowout precursor detection unit 130. Such controllers controlling the operation of a combustor are well known, and therefore are not described in detail as a part of this disclosure. Upon receiving a signal indicating the detection of a blowout precursor by the signal processing logic 235, the combustion controller 140 will make appropriate adjustments to the operating parameters of the combustor 110 to prevent blowout. Parameters adjusted may include but are not limited to the amount of fuel from the fuel inlet nozzles, the amount of compressed air allowed in the combustion chamber, and the desired engine power output.

FIG. 3 is a flow chart illustrating the architecture, functionality and/or operation of the signal processing logic 235. As illustrated in FIG. 3, the method begins by receiving pressure data from the pressure measuring device 320. The data may be received from either a digital or analog pressure measuring device 120. If the pressure measuring device 120 is analog, one of ordinary skill in the art would appreciate the step of sampling the data and performing known signal processing techniques to ensure an accurate and quality digital representation of the analog signal, such as implementing anti-aliasing filters.

The received pressure data may be analyzed by one or more of three different signal analysis techniques of the present invention: spectral analysis 330, statistical analysis 340, and wavelet analysis 350. The spectral analysis, statistical analysis, and wavelet analysis techniques may be based on the pressure data in its entirety or any smaller subset of the pressure data. For instance, the subset of the pressure data may consist of a sample of a quarter of a second, although any subset of data may be used in this technique.

FIGS. 4–19 describe in more detail the specific signal processing techniques involved with the three analysis techniques. As described below, each of the three analysis techniques involve multiple sub-methods of analysis. When implementing this method, it is contemplated that any combination of the spectral analysis 330, statistical analysis 340, and wavelet analysis 350 techniques may be used. That is, the method may use one, two, or all three of the analysis techniques and any combination of their respective sub-methods to analyze the pressure data.

After the pressure data is analyzed by one or more of the steps 330, 340, and 350, the existence of a blowout precursor is determined at step 360. As described in more detail in FIGS. 4–19, the results of the analysis steps 330, 340, 350 may indicate that a flame is nearing blowout conditions, such as in the form of a binary output (e.g., a "1" represents the detection of a blowout precursor and "0" represents no detection of a blowout precursor). A positive indication of the flame nearing blowout conditions is known as a blowout precursor. Determination of a blowout precursor may be based on any combination of the results of the analysis techniques and their respective sub-methods described below. For example, the results of spectral analysis (step 330) on the pressure data may indicate that the flame is nearing blowout conditions, but the statistical analysis (step 340) and wavelet analysis (step 350) results may not indicate a proximity to blowout conditions based on the same data. In such a situation, the blowout precursor determination step 360 may include the determination that the indication from a single analysis technique, the spectral analysis in this illustrative example, is sufficient to indicate blowout conditions, and thus positively identify the existence of a blowout precursor.

Thus, it is contemplated that the results of the spectral analysis, statistical analysis, and wavelet analysis can be combined in any manner to detect blowout precursors. That is, the results of the spectral analysis, statistical analysis, and wavelet analysis may be used individually or in combination to identify blowout precursors 360. The combination may be defined by any logical or mathematical relationship suitable for such determination, including but not limited to a specific weighting scheme wherein the results of one analysis technique is weighed more heavily in the determination than the others. The combination of such analysis techniques also may be user dependent. The user may decide how close to flame blowout the combustor is desired to operate. For instance, if the operator of the turbine engine wants the combustor to operate extremely close to blowout conditions to reduce emissions, the blowout precursor determination logic may require all three of the analysis techniques to indicate, or even strongly indicate, that the flame is near blowout to positively identify the existence of a blowout precursor. The method for determining blowout precursors may end after the blowout precursor detection step 360, or alternatively, the method may continuously operate on the pressure data as it is received from the combustor.

FIG. 4 illustrates an exemplary embodiment of the spectral analysis technique that may be implemented to identify blowout precursors. The first substantive step in performing spectral analysis is to take the Fourier Transform of the pressure data received from the pressure measuring device 120. The Fourier Transform is well known to those skilled in the art to be a technique of separating the pressure data into its frequency components. Separation of the pressure data in the frequency domain allows the pressure data to be more precisely analyzed by identifying signal characterizations on a per frequency basis. Certain frequencies and frequency ranges have been identified as a part of the present invention as being strong indicators to blowout precursor detection. As shown in FIG. 5, the power spectral density (PSD) of the raw pressure data changes shape with frequency. $\Phi$ is the equivalence ratio, which is defined as the fuel/air ratio normalized by its stoichiometric value. $\Phi_{LBO}$ is the equivalence ratio at blowout conditions. A "$\Phi/\Phi_{LBO}$" value equal to one represents blowout. Thus, FIG. 5 shows that the shape of the PSD changes as the equivalence ratio approaches blowout conditions.

As further shown in FIG. 4, the spectral analysis technique may be subdivided into two separate analysis sub-methods as further embodiments of the present invention. The results of each sub-method may individually or in combination with other sub-methods identify the existence of a blowout precursor. The combination of sub-method results may be defined by any suitable logic or mathematical relationship.

The first spectral analysis sub-method involves determining the power of the pressure data between a first frequency and a second frequency and calculating a power ratio by normalizing the power by the total spectral power of the pressure data, as indicated in step 420. The normalization of the power allows this sub-method to not be turbine specific nor be dependent on operating conditions such as temperature, atmospheric pressure, humidity, fuel composition, etc. At step 430, the power ratio is monitored to detect a predetermined increase.

In an exemplary embodiment, a first frequency of between 10 Hz and 100 Hz and a second frequency of between 100 Hz and 500 Hz have been proven effective. However, this invention is not limited to those specific ranges. Any frequency ranges that can be used to determine the existence of a blowout precursor is contemplated by this invention.

The second sub-method of the spectral analysis technique involves determining the power of the pressure data at a specific frequency and calculating a power ratio by normalizing the power at a given frequency by the total spectral power of the pressure data as indicated in step 440. The normalization of the power at a specific frequency also allows this sub-method to not be turbine specific nor be dependent on operating conditions such as temperature, atmospheric pressure, humidity, fuel composition, etc.

In an exemplary embodiment, the power ratio of the second sub-method will be determined using a power at a single frequency between 10 Hz and 500 Hz. However, this invention is not limited to the power within that specific frequency range. Any frequency that can be used to determine the existence of a blowout precursor is contemplated by this invention.

Increases in the power ratios determined by steps 420 and 440 may be monitored to indicate that the flame is nearing blowout conditions as indicated by steps 430 and 450. Each power ratio calculated in step 420, 440 may be analyzed separately to determine a flame's proximity to blowout conditions. FIG. 6 illustrates that the magnitude of the power ratio of step 420 dramatically increases near blowout conditions. FIG. 7 shows that a similar phenomenon exists for the power ratio calculated in step 440. The detection of a blowout precursor based on the increase in the respective power ratios may be identified in several ways.

One manner of determining a blowout precursor based on an increase in the power ratio, such as in steps 430 and 450, is to set a predetermined threshold for the power ratio. The predetermined threshold value may vary between the power ratios identified in steps 420 and 440. Each power ratio may be monitored to determine if the power ratio exceeds the predetermined threshold. If the power ratio exceeds the threshold, a blowout precursor may be detected. For instance, if the power ratio in step 420 exceeds a threshold of 0.02, the blowout precursor determination logic 360 may indicate that the combustor is near blowout. However, any threshold value that indicates that blowout conditions are nearing is contemplated for steps 430 and 450.

A second manner for determining blowout precursors from monitoring an increase in the power ratio involves monitoring the rate of increase of the power ratio. For instance, a blowout precursor may be identified if the rate of increase exceeds a predetermined slope. It is also contemplated that a more complex analysis of the rate of increase of the power ratio may be used to identify a blowout precursor.

FIG. 8 illustrates the exemplary embodiment of the statistical analysis techniques of step 340 in FIG. 3 for determining the existence of a blowout precursor. Under this approach, the statistical moment of the pressure data or at least a subset of the pressure data received from the pressure measuring device 130 is calculated at step 810. While the statistical moment calculation is well known to those of ordinary skill in the art, it is noted that the n'th statistical moment of the pressure data, $M_n$, is defined here as:

$$M_n = \frac{\int_{t=0}^{T} (p'(t) - \overline{p})^n \, dt}{\left[\int_{t=0}^{T} (p'(t) - \overline{p})^2 \, dt\right]^{n/2}}$$

The statistical moment may be calculated for an "n" of any value to determine the nth statistical moment. In one embodiment, the fourth statistical moment, better known as the Kurtosis (the kurtosis is usually defined as $M_4-3$, rather than just $M_4$ as we define it here. For the purposes of this invention, all references to the kurtosis refer to $M_4$; all methods described here apply equally well if the more conventional definition is used) is used to detect the existence of blowout precursors. The Kurtosis provides a sufficient balance between calculation speed and value sensitivity related to blowout conditions. Analysis of any moment, $M_n$, where n>2 can also be used for blowout precursor detection. For example, as shown in FIG. 9, a higher moment, in this case the $6^{th}$ moment, may be used.

Similar to the spectral analysis technique, the statistical analysis technique includes four sub-methods as further embodiments of the present invention. Each sub-method may be used individually or in combination with another sub-method to determine the existence of a blowout precursor. The combination of sub-method results may be defined by any suitable logic or mathematical relationship.

The first sub-method involves the step of monitoring the magnitude of the statistical moment values 815 that were determined in step 810. Increases in the magnitude may be monitored to indicate that the flame is nearing blowout conditions. As the plot in FIG. 10 illustrates, the magnitude of the statistical moment data will substantially increase when blowout conditions are neared. The detection of a blowout precursor based on the increase in the magnitude of the statistical moment data may be identified in several ways.

One manner of determining a blowout precursor based on an increase in the magnitude of the statistical moment data would be to set a predetermined threshold for the magnitude of the statistical moment data. The magnitude of the statistical moment data may then be monitored to determine if the magnitude exceeds the predetermined threshold. If the magnitude exceeds the threshold, a blowout precursor may be detected. For instance, if the magnitude in step 815 exceeds a threshold of 3.2, the blowout precursor determination of step 360 in FIG. 3 may indicate that a blowout precursor exists. However, any threshold value that indicates that blowout conditions are nearing is contemplated in this invention.

A second manner for determining blowout precursors from monitoring an increase in the magnitude of the statistical moment data involves monitoring the rate of increase of the magnitude of the statistical moment data. A blowout precursor may be identified if the rate of increase exceeds a predetermined slope. As previously stated, it is also contemplated that a more complex analysis of the rate of increase of the magnitude of the statistical moment data may be used to identify a blowout precursor.

The second sub-method involves the step of determining the variance of the statistical moment values 820 that were determined in step 810. Calculation of the variance of a data set is well known in the art and therefore need not be discussed herein. The variance of the statistical moment data will then be monitored for sufficient increases to indicate a blowout precursor at step 825. As FIG. 11 illustrates, the variance of the statistical moment data increases significantly near blowout conditions, that is, when $\Phi/\Phi_{LBO}$ equal to one. Methods for determining the existence of a blowout precursor based on step 825 are similar to those described above for step 815. For example, one can examine the increase based on a threshold variance value or a rate of increase in the variance. An applicable variance threshold for the Kurtosis, for example, has been determined to be 0.35. However, any variance threshold value that indicates a blowout condition is contemplated and can be applied to any order statistical moment calculation.

The third sub-method under statistical analysis involves determining the existence of a blowout condition based on the repetitiveness of the magnitude of the statistical moment exceeding a predefined threshold over a given time segment, as indicated by steps 830, 835, 840. The sub-method initially divides the pressure data into time segments at step 830. The time segments can span any conceivable length of time. In the exemplary embodiment, the time segments are ¼ of a second. Next, a statistical moment threshold is defined at step 835. The technique then involves counting the number of instances in the given time segment that the statistical moment exceeds the predefined statistical moment threshold, as indicated by step 840. An increase in the occurrence of the statistical moment magnitude exceeding the predefined threshold value indicates that blowout conditions are being encountered. FIG. 12 illustrates a plot of the Kurtosis over a time segment. The dotted line in each graph of the FIG. 12 represents a predefined threshold value, which may be subjectively or objectively defined. As can be seen from the plots, the Kurtosis value exceeds the threshold more frequently when $\Phi/\Phi_{LBO}$ approaches one, that is, approaches blowout conditions. FIG. 13 demonstrates the same phenomenon by plotting the alarms (each occurrence of the magnitude exceeding the threshold) per second versus $\Phi/\Phi_{LBO}$.

The fourth sub-method of statistical analysis involves determining the existence of a blowout condition based on total elapsed time that the magnitude of the statistical moment exceeds a predefined threshold over a given time segment, as indicated by steps 845, 850, and 855. The fourth sub-method begins by dividing the pressure data into time segments at step 845. The time segments can span any conceivable length of time. In the exemplary embodiment, the time segments are ¼ of a second. Next, a statistical moment threshold is defined as indicated by step 850. The sub-method then involves calculating the total elapsed time in the given time segment that the magnitude of the statistical moment exceeds the predefined statistical moment threshold, as indicated by step 855. An increase in the total time per time segment that the magnitude of the statistical moment data exceeds the predefined threshold value indicates that blowout conditions are being encountered. FIG. 14 illustrates that the duration of elapsed time that the magnitude of the statistical moment data resides above the given threshold increases when blowout conditions are neared.

It is also contemplated that the statistical analysis technique 340 and all of its sub-methods, e.g., steps 810–855, may be applied to only a frequency subset of the raw data. To that end, a bandpass filter may be used on the raw pressure data to filter out unwanted frequency ranges before the pressure data is subjected to statistical moment calculations. The methods described above for the statistical analysis of step 340 will be similarly applied to the bandpass filtered data.

FIG. 15 illustrates another embodiment of the present invention which implements wavelet analysis techniques for determining the existence of a blowout precursor. The method for detecting blowout precursors using the wavelet transform begins by taking the wavelet transform of the pressure data, as indicated by step 1510. The wavelet transform is well known to those of ordinary skill in the art and may be defined as:

$$f_\psi(t) = \int_{t'} W((t' - t)/\psi) p(t') \, dt'$$

where p(t) is the raw time series data, $\psi$ is a scaling parameter, and W(t) is the wavelet basis function. Time localized bursting events may be noticed after the pressure data is transformed by the wavelet transform. The present invention contemplates developing customized wavelet shapes that closely resemble these empirically observed bursting events to better identify blowout conditions. The resulting wavelet transformed data may then be optimized for zeroing in on these bursting events as they occur. Conventional wavelet basis functions, such as the Morlet or Mexican Hat wavelets may also be used in the detection of blowout precursors.

After the wavelet transform of the pressure data has been taken at step 1510, the wavelet analysis technique may be subdivided into at least five wavelet analysis sub-methods as further embodiments of the present invention. Each wavelet sub-method may be analyzed individually or in combination with other analysis methods to determine the existence of a blowout precursor. The combination of sub-method results may be defined by any suitable logic or mathematical relationship.

The first wavelet sub-method begins by determining the Root Mean Square (RMS) value of the wavelet transformed pressure data at some scale, $\psi$, and the RMS value of the raw pressure data as indicated in step 1515. The RMS calculation is well known to those of ordinary skill in the art, and therefore, need not be described herein. A RMS ratio is then calculated by dividing the RMS value of the wavelet transformed pressure data by the RMS value of the raw pressure data as indicated in step 1520. The normalization of the power allows this sub-method to not be turbine specific nor be dependent on operating conditions such as temperature, atmospheric pressure, humidity, fuel composition, etc.

As shown in FIG. 16, the RMS ratio increases as blowout approaches, and thus, monitoring the increase in the RMS ratio indicate blowout conditions may exist, as indicated by step 1525. One manner of determining a blowout precursor based on an increase in the RMS ratio would be to set a predetermined threshold for the RMS ratio. The amount of increase of the RMS Ratio depends upon the value of the scaling parameter, $\psi$. In an exemplary embodiment, $\psi$ values that roughly correspond to wavelet time scales of 1/500 to 1/20 seconds have worked well. However, the present invention is in no way limited to time scales of between 1/500 and 1/20. Any time scale value may be used to predict the onset of flame blowout. The RMS ratio may then be monitored to determine if the RMS ratio exceeds the predetermined threshold, as indicated by step 1525. If the RMS ratio exceeds the threshold, a blowout precursor may be detected. For instance, if the RMS ratio in step 1525 exceeds a threshold of 0.1, the blowout precursor determination at step 360 may indicate that a blowout precursor exists. However, any threshold value that indicates that blowout conditions are nearing is contemplated in this invention.

A second manner for determining blowout precursors from monitoring an increase in the RMS ratio at step 1525 involves monitoring the rate of increase of the RMS ratio. A blowout precursor may be identified if the rate of increase exceeds a predetermined slope. As previously stated, it is also contemplated that a more complex analysis of the rate of increase of the RMS ratio may be used to identify a blowout precursor.

The second wavelet sub-method involves determining the existence of a blowout condition based on the repetitiveness of the magnitude of the wavelet transformed data exceeding a predefined threshold over a given time segment, as indicated by steps 1530, 1535 and 1540. The second wavelet sub-method begins by dividing the pressure data into time segments at step 1535. An exemplary embodiment of the present invention utilized a time segment of ¼ of a second. However, the time segments can span any conceivable length of time that may be used to identify a blowout precursor.

Next, a magnitude of the wavelet transformed pressure data threshold is defined at step 1535. In an exemplary embodiment, the magnitude threshold value may be approximately four to seven times the RMS value of the wavelet transformed pressure data. However, any magnitude threshold value is contemplated that may be used to identify a blowout precursor. The sub-method then involves counting the number of instances in the given time segment that the wavelet transformed data exceeds the predefined magnitude threshold, as indicated by step 1540. Referring to FIG. 17, the dotted line in each graph of the figure represents a predefined threshold value, which may be subjectively or objectively defined. As can be seen from FIG. 17, the magnitude of the wavelet coefficient value exceeds the threshold more frequently when $\Phi/\Phi_{LBO}$ approaches one, that is, approaches blowout conditions. FIG. 18 demonstrates the same phenomenon by plotting the alarms (each occurrence of the magnitude exceeding the threshold) per second versus $\Phi/\Phi_{LBO}$. As shown in FIG. 18, an increase in the occurrences of the magnitude of the wavelet transformed data exceeding the predefined threshold value indicates that blowout conditions are being encountered.

The third wavelet sub-method involves determining the existence of a blowout condition based on the total elapsed time that the magnitude of the wavelet transformed data exceeds a predefined threshold over a given time segment, as indicated by steps 1545, 1550 and 1555. The third wavelet sub-method begins by dividing the pressure data into time segments 1545. An exemplary embodiment of the present invention utilized a time segment of ¼ of a second. However, the time segment can span any conceivable length of time that may be used to identify a blowout precursor.

Next, a magnitude of the wavelet transformed pressure data threshold is defined at step 1550. The third wavelet sub method then involves calculating the total elapsed time in the given time segment that the magnitude of the wavelet transformed data exceeds the predefined magnitude threshold, as indicated by step 1555. As shown in FIG. 19, an increase in the total time per time segment that the magnitude of the wavelet transformed data exceeds the predefined magnitude threshold value indicates that blowout conditions are being encountered.

The fourth wavelet sub-method involves determining the existence of a blowout condition by performing statistical analysis on the wavelet transformed data as indicated by steps 1560 and 1565. This sub-method begins by calculating the statistical moment of the wavelet transformed data using the statistical moment equation defined above at step 1560. The exemplary embodiment of this method utilizes the fourth moment, but any order of moment may be used by this method.

Increases in the magnitude may be monitored to indicate that the flame is nearing blowout conditions, as indicated by step 1565. The detection of a blowout precursor based on the increase in the magnitude of the statistical moment of the wavelet transformed data may be identified in several ways. One manner of determining a blowout precursor based on an increase in the magnitude of the statistical moment of the wavelet transformed data would be to set a predetermined threshold for the magnitude of the statistical moment of the wavelet transformed data. The magnitude of the statistical moment of the wavelet transformed data may then be monitored to determine if the magnitude exceeds the predetermined threshold. If the magnitude exceeds the threshold, a blowout precursor may be detected. Any threshold value that indicates that blow conditions are nearing is contemplated in this invention.

A second manner for determining blowout precursors from monitoring an increase in the magnitude of the statistical moment of the wavelet transformed data involves monitoring the rate of increase of the magnitude of the statistical moment of the wavelet transformed data. A blowout precursor may be identified if the rate of increase exceeds a predetermined slope. As previously stated, it is also contemplated that a more complex analysis of the rate of increase of the magnitude of the statistical moment of the wavelet transformed data may be used to identify a blowout precursor.

The fifth wavelet sub-method begins by dividing the wavelet transformed pressure data into time segments at step 1570. The time segments can span any conceivable length of time. In the exemplary embodiment, the time segments are ¼ of a second. Similar to the fourth wavelet sub-method, the statistical moment of the wavelet transformed pressure data in the given time segment may be calculated at step 1575.

The variance of the statistical moment of the wavelet transformed data may then be calculated at step 1580. Calculation of the variance of a data set is well known in the art. The variance will then be monitored for sufficient increases to indicate a blowout precursor, as indicated by step 1585. Methods for determining the existence of a blowout precursor are similar to those described above for step 1565, that is, by monitoring the increase based on a threshold variance value or a rate of increase in the variance. Any variance threshold value that indicates a blowout condition is contemplated.

Referring back to FIG. 3, results of the various sub-methods of the spectral analysis step 330, statistical analysis step 340, and wavelet analysis step 350 are then analyzed to determine if an ultimate blowout precursor exists 360. This blowout precursor determination logic 360 may be as simple as looking for any one sub-method to indicate that blowout conditions are imminent. Alternatively, the blowout precursor determination logic 360 may be as sophisticated as to including weighting of the multitude of analysis sub-methods based on suitable factors, such as environmental operating conditions, fuel composition, combustor type, to determine if a blowout precursor exists. In addition, the results of the analysis sub-methods may be other than a binary indication (e.g., a slope or the number of times a threshold is exceeded), but may be indicative of the likelihood of the existence of a blowout precursor. Thus, the sub-methods may result in values indicative of the likelihood (or strength) that a blowout precursor exists, which may be normalized and combined. Thus, any combination of the analytical results from methods identified in FIGS. 4, 8, and 15 may be used to determine if a blowout precursor exists and if action should be taken to prevent flame blowout.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in generic and descriptive sense only and not for purposes of limitation.

What is claimed is:

1. A system for acoustic detection of blowout precursors comprising:
   a combustor;
   a pressure measuring device in communication with the combustor, wherein the pressure measuring device generates pressure signals indicative of the pressure in the combustor; and
   a blowout precursor detection unit that receives the pressure signals and performs at least one of a spectral analysis, statistical analysis, and wavelet analysis to identify a blowout precursor.

2. The system as in claim 1, further comprising a combustion controller that controls operation of the combustor based at least in part on detection of a blowout precursor by the blowout precursor detection unit.

3. A method for detecting blowout precursors in combustors comprising:
   receiving pressure data measured by an acoustic pressure device associated with the combustor;
   performing spectral analysis on the pressure data using Fourier transform analysis;
   performing statistical analysis on the pressure data using statistical moments;
   performing wavelet analysis on the pressure data using wavelet transform analysis; and
   determining the existence of a blowout precursor based on one or more of the spectral analysis, statistical analysis, and wavelet analysis.

4. A method for detecting blowout precursors in combustors comprising:
   receiving pressure data measured by an acoustic pressure device associated with a combustor;

performing spectral analysis on the pressure data using Fourier transform analysis; and determining the existence of a blowout precursor based on the spectral analysis.

5. The method of claim 4, wherein performing spectral analysis comprises:

determining a Fourier transform of at least part of the pressure data; and determining a power ratio of power in a frequency range normalized by total spectral power.

6. The method of claim 5, wherein determining the existence of a blowout precursor comprises determining the existence of a blowout precursor based on a predefined change in the power ratio.

7. The method of claim 4, wherein performing spectral analysis comprises:

determining a Fourier transform of at least part of the pressure data; and determining a power ratio of power at a specific frequency normalized by total spectral power.

8. The method of claim 7, wherein determining the existence of a blowout precursor comprises determining the existence of a blowout precursor based on a predefined change in the power ratio.

9. A method for determining blowout precursors in combustors, comprising:

receiving pressure data measured by an acoustic pressure of a combustor;

performing statistical analysis on the pressure data using statistical moments; and determining the existence of a blowout precursor based on the statistical analysis.

10. The method of claim 9, wherein performing statistical analysis comprises:

determining a statistical moment of at least part of the pressure data.

11. The method of claim 10, wherein determining the existence of a blowout precursor comprises determining the existence of a blowout precursor based on a predefined change in a magnitude of the statistical moment.

12. The method of claim 9, wherein performing statistical analysis comprises:

determining a statistical moment of at least part of the pressure data; and determining the variance of the statistical moment.

13. The method of claim 12, wherein determining the existence of a blowout precursor comprises determining the existence of a blowout precursor based on a predefined change in the variance of the statistical moment.

14. The method of claim 9, wherein performing statistical analysis comprises:

determining a statistical moment of at least part of the pressure data;

dividing the statistical moment pressure data into a plurality of time segments; and defining a statistical moment threshold.

15. The method of claim 14, wherein determining the existence of a blowout precursor comprises determining the existence of a blowout precursor based on a number of instances in a given time segment that the statistical moment exceeds the statistical moment threshold.

16. The method of claim 14, wherein determining the existence of a blowout precursor comprises determining the existence of a blowout precursor based on a total time in a given time segment that the statistical moment exceeds the statistical moment threshold.

17. The method of claim 9, further comprising filtering the pressure data with a bandpass filter.

18. A method for determining blowout precursors in combustors, comprising:

receiving pressure data measured by an acoustic pressure device associated with the combustor;

performing wavelet analysis on the pressure data; and determining the existence of a blowout precursor from the results of the wavelet analysis.

19. The method of claim 18, wherein performing wavelet analysis comprises:

determining a wavelet transform of at least part of the pressure data;

defining a root mean square of wavelet transform threshold; and determining a ratio of the root mean square of the wavelet transform of the pressure data to the root mean square of pressure data.

20. The method of claim 19, wherein determining the existence of a blowout precursor comprises determining the existence of a blowout precursor based on a predefined change in the ratio.

21. The method of claim 18, wherein performing wavelet analysis comprises:

determining the wavelet transform of at least part of the pressure data; and defining a wavelet transform threshold.

22. The method of claim 21, wherein determining the existence of a blowout precursor comprises determining the existence of a blowout precursor based on a number of instances in a given time segment that the wavelet transform of the pressure data exceeds the wavelet transform threshold.

23. The method of claim 21, wherein determining the existence of a blowout precursor comprises determining the existence of a blowout precursor based on a total time in a given time segment that the wavelet transform of the pressure data exceeds the wavelet transform threshold.

24. The method of claim 18, wherein performing wavelet analysis comprises:

determining a wavelet transform of at least part of the pressure data; and determining statistical moment data from the wavelet transform of the pressure data.

25. The method of claim 24, wherein determining the existence of a blowout precursor comprises determining the existence of a blowout precursor based on a predefined change in magnitude of the statistical moment data.

26. The method of claim 18, wherein performing wavelet analysis comprises:

determining a wavelet transform of at least part of the pressure data;

dividing the statistical moment data into a plurality of time segments;

determining statistical moment data from the wavelet transform of the pressure data for each time segment; and determining the variance of the statistical moment data for each time segment.

27. The method of claim 26, wherein determining the existence of a blowout precursor comprises determining the existence of a blowout precursor based on a predefined change in the variance of the statistical moment data.

* * * * *